United States Patent
Fujiki

(10) Patent No.: US 10,908,481 B2
(45) Date of Patent: Feb. 2, 2021

(54) CAMERA SYSTEM, CAMERA BODY, LENS UNIT, STOP ADJUSTMENT METHOD, AND PROGRAM

(71) Applicant: FUJIFILM Corporation, Tokyo (JP)

(72) Inventor: Shinichiro Fujiki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/783,633

(22) Filed: Feb. 6, 2020

(65) Prior Publication Data

US 2020/0174345 A1  Jun. 4, 2020

Related U.S. Application Data

(63) Continuation of application No. PCT/JP2018/020307, filed on May 28, 2018.

(30) Foreign Application Priority Data

Aug. 22, 2017  (JP) .................................. 2017-159561

(51) Int. Cl.
*G03B 17/14* (2006.01)
*G03B 17/20* (2006.01)
(Continued)

(52) U.S. Cl.
CPC ............. *G03B 17/14* (2013.01); *G03B 17/20* (2013.01); *H04N 5/2252* (2013.01); *H04N 5/2254* (2013.01); *G02B 7/02* (2013.01)

(58) Field of Classification Search
CPC .......... G03B 17/14; G03B 17/20; G02B 7/02; H04N 5/2252
See application file for complete search history.

(56) References Cited

U.S. PATENT DOCUMENTS 5,257,053 A * 10/1993 Kobayashi ............. G02B 7/102
396/87

FOREIGN PATENT DOCUMENTS

| JP | 5-181047 A | 7/1993 |
| JP | 2005-292325 A | 10/2005 |
| JP | 2008-26526 A | 2/2008 |

OTHER PUBLICATIONS

International Preliminary Report on Patentability and Written Opinion of the International Searching Authority(Forms PCT/IB/326, PCT/IB/373 and PCT/ISA/237), dated Mar. 5, 2020, for International Application No. PCT/JP2018/020307, with an English Translation.

(Continued)

*Primary Examiner* — Minh Q Phan
(74) *Attorney, Agent, or Firm* — Birch, Stewart, Kolasch & Birch, LLP

(57) ABSTRACT

Provided are a camera system, a camera body, a lens unit, a stop adjustment method, and a program that allow a user to change a sort order of a single auto indication and a plurality of aperture values.

The camera system includes: a lens unit that includes a stop ring selecting a single auto indication corresponding to an auto mode and a plurality of aperture values corresponding to a manual mode in accordance with a rotational angle; and a camera body on which the lens unit can be interchangeably mounted. The camera body includes a display section which is capable of rewriting a sort order of the single auto indication and the plurality of aperture values, and a camera control section which executes a change mode for changing a sort order of the plurality of aperture values and the single auto indication corresponding to the rotational angle of the stop ring.

10 Claims, 20 Drawing Sheets

(51) Int. Cl.
*H04N 5/225* (2006.01)
*G02B 7/02* (2021.01)

(56) References Cited

OTHER PUBLICATIONS

International Search Report (Form PCT/ISA/210), dated Aug. 28, 2018, for International Application No. PCT/JP2018/020307, with an English translation.

* cited by examiner

FIG. 2
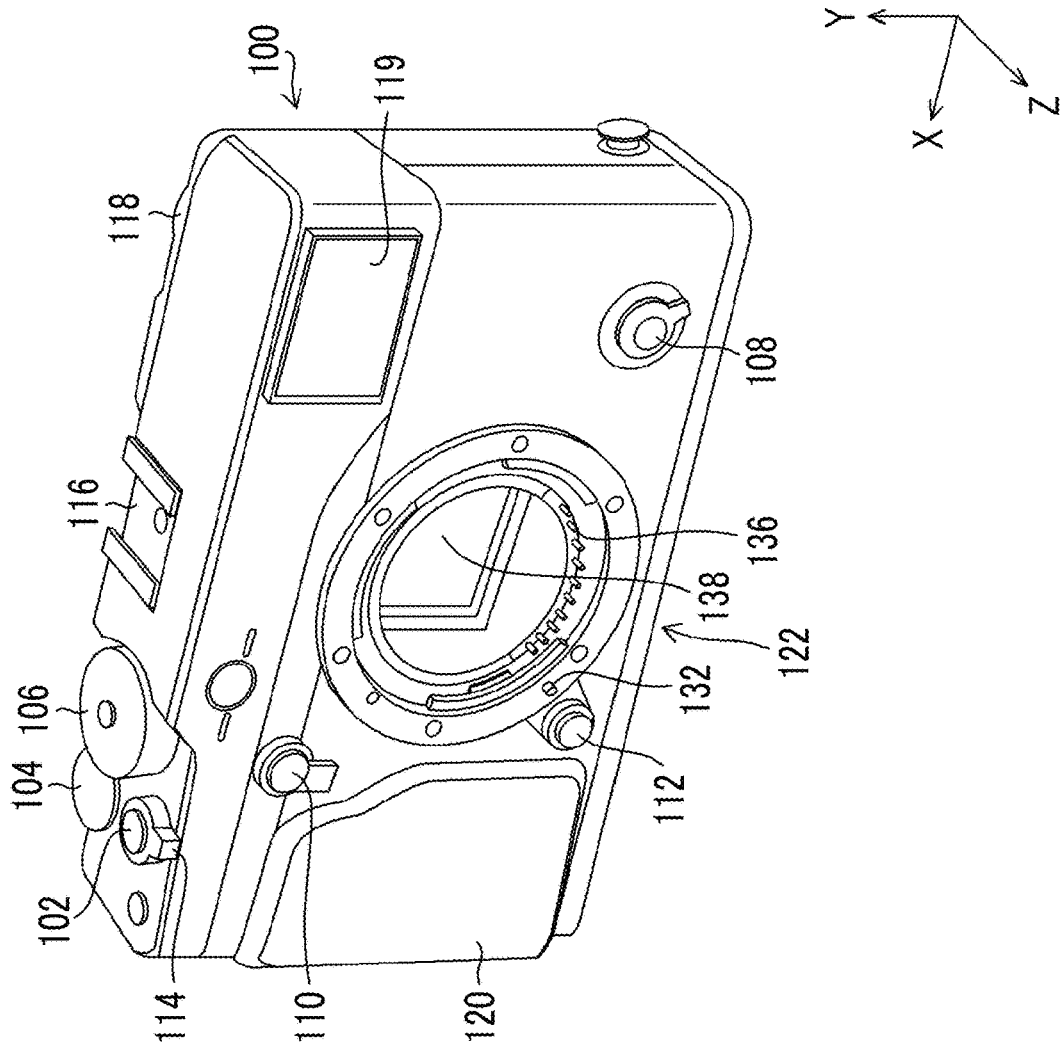
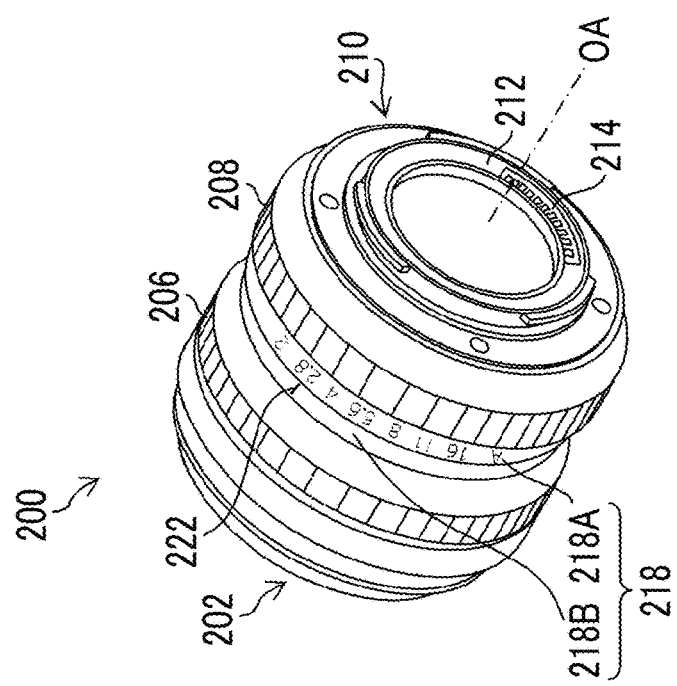

FIG. 6

| ROTATIONAL POSITION | CIRCUIT WIRING | | | | | | ELECTRIC SIGNAL |
|---|---|---|---|---|---|---|---|
| | C6 | C5 | C4 | C3 | C2 | C1 | |
| A | 1 | 1 | 1 | 1 | 1 | 0 | 111110 |
| 16 | 1 | 1 | 1 | 1 | 0 | 0 | 111100 |
| 14 | 1 | 1 | 0 | 1 | 0 | 0 | 110100 |
| 13 | 1 | 1 | 0 | 1 | 1 | 0 | 110110 |
| 11 | 1 | 1 | 0 | 1 | 1 | 1 | 110111 |
| 10 | 1 | 1 | 0 | 1 | 0 | 1 | 110101 |
| 9 | 1 | 1 | 1 | 1 | 0 | 1 | 111101 |
| 8 | 1 | 1 | 1 | 0 | 0 | 1 | 111001 |
| 7.1 | 1 | 1 | 0 | 0 | 0 | 1 | 110001 |
| 6.3 | 1 | 1 | 0 | 0 | 1 | 1 | 110011 |
| 5.6 | 1 | 1 | 0 | 0 | 1 | 0 | 110010 |
| 5 | 1 | 1 | 1 | 0 | 1 | 0 | 111010 |
| 4.5 | 1 | 0 | 1 | 0 | 1 | 0 | 101010 |
| 4 | 1 | 0 | 1 | 1 | 1 | 0 | 101110 |
| 3.5 | 1 | 0 | 1 | 1 | 0 | 0 | 101100 |
| 3.2 | 1 | 0 | 1 | 1 | 0 | 1 | 101101 |
| 2.8 | 1 | 0 | 1 | 1 | 1 | 1 | 101111 |
| 2.5 | 1 | 0 | 1 | 0 | 1 | 1 | 101011 |
| 2.2 | 1 | 1 | 1 | 0 | 1 | 1 | 111011 |
| 2 | 0 | 1 | 1 | 0 | 1 | 1 | 011011 |

FIG. 8

| INITIAL STATE ||||
|---|---|---|---|
| ROTATIONAL POSITION | OUTPUT SIGNAL | POSITION NUMBER | UNIT NUMBER |
| A | 111110 | 0 | AE |
| 16 | 111100 | 19 | F16 |
| 14 | 110100 | 18 | F14 |
| 13 | 110110 | 17 | F13 |
| 11 | 110111 | 16 | F11 |
| 10 | 110101 | 15 | F10 |
| 9 | 111101 | 14 | F9 |
| 8 | 111001 | 13 | F8 |
| 7.1 | 110001 | 12 | F7.1 |
| 6.3 | 110011 | 11 | F6.3 |
| 5.6 | 110010 | 10 | F5.6 |
| 5 | 111010 | 9 | F5 |
| 4.5 | 101010 | 8 | F4.5 |
| 4 | 101110 | 7 | F4 |
| 3.5 | 101100 | 6 | F3.5 |
| 3.2 | 101101 | 5 | F3.2 |
| 2.8 | 101111 | 4 | F2.8 |
| 2.5 | 101011 | 3 | F2.5 |
| 2.2 | 111011 | 2 | F2.2 |
| 2 | 011011 | 1 | F2 |

FIG. 14

| INITIAL STATE | | | 1-A MODE | | 1-B MODE | | 1-C MODE | |
|---|---|---|---|---|---|---|---|---|
| ROTATIONAL POSITION | ELECTRIC SIGNAL | POSITION NUMBER | UNIT NUMBER | POSITION NUMBER | UNIT NUMBER | POSITION NUMBER | UNIT NUMBER | POSITION NUMBER | UNIT NUMBER |
| A | 111110 | 0 | AE | 0 | AE | 1 | F2 | 19 | F16 |
| 16 | 111100 | 19 | F16 | 1 | F2 | 2 | F2.2 | 18 | F14 |
| 14 | 110100 | 18 | F14 | 2 | F2.2 | 3 | F2.5 | 17 | F13 |
| 13 | 110110 | 17 | F13 | 3 | F2.5 | 4 | F2.8 | 16 | F11 |
| 11 | 110111 | 16 | F11 | 4 | F2.8 | 5 | F3.2 | 15 | F10 |
| 10 | 110101 | 15 | F10 | 5 | F3.2 | 6 | F3.5 | 14 | F9 |
| 9 | 111101 | 14 | F9 | 6 | F3.5 | 7 | F4 | 13 | F8 |
| 8 | 111001 | 13 | F8 | 7 | F4 | 8 | F4.5 | 12 | F7.1 |
| 7.1 | 110001 | 12 | F7.1 | 8 | F4.5 | 9 | F5 | 11 | F6.3 |
| 6.3 | 110011 | 11 | F6.3 | 9 | F5 | 10 | F5.6 | 10 | F5.6 |
| 5.6 | 110010 | 10 | F5.6 | 10 | F5.6 | 11 | F6.3 | 9 | F5 |
| 5 | 111010 | 9 | F5 | 11 | F6.3 | 12 | F7.1 | 8 | F4.5 |
| 4.5 | 101010 | 8 | F4.5 | 12 | F7.1 | 13 | F8 | 7 | F4 |
| 4 | 101110 | 7 | F4 | 13 | F8 | 14 | F9 | 6 | F3.5 |
| 3.5 | 101100 | 6 | F3.5 | 14 | F9 | 15 | F10 | 5 | F3.2 |
| 3.2 | 101101 | 5 | F3.2 | 15 | F10 | 16 | F11 | 4 | F2.8 |
| 2.8 | 101111 | 4 | F2.8 | 16 | F11 | 17 | F13 | 3 | F2.5 |
| 2.5 | 101011 | 3 | F2.5 | 17 | F13 | 18 | F14 | 2 | F2.2 |
| 2.2 | 111011 | 2 | F2.2 | 18 | F14 | 19 | F16 | 1 | F2 |
| 2 | 011011 | 1 | F2 | 19 | F16 | 0 | AE | 0 | AE |

FIG. 16

| ROTATIONAL POSITION | INITIAL STATE | | | 2-A MODE | | 2-B MODE | | 2-C MODE | | 2-D MODE | |
|---|---|---|---|---|---|---|---|---|---|---|---|
| | ELECTRIC SIGNAL | POSITION NUMBER | UNIT NUMBER | POSITION NUMBER | UNIT NUMBER | POSITION NUMBER | UNIT NUMBER | POSITION NUMBER | UNIT NUMBER | POSITION NUMBER | UNIT NUMBER |
| A | 111110 | 0 | AE | 19 | F16 | 19 | F16 | 19 | F16 | 19 | F16 |
| 16 | 111100 | 19 | F16 | 18 | F14 | 18 | F14 | 18 | F14 | 0 | AE |
| 14 | 110100 | 18 | F14 | 17 | F13 | 17 | F13 | 17 | F13 | 18 | F14 |
| 13 | 110110 | 17 | F13 | 16 | F11 | 16 | F11 | 16 | F11 | 17 | F13 |
| 11 | 110111 | 16 | F11 | 15 | F10 | 15 | F10 | 15 | F10 | 16 | F11 |
| 10 | 110101 | 15 | F10 | 14 | F9 | 14 | F9 | 14 | F9 | 15 | F10 |
| 9 | 111101 | 14 | F9 | 13 | F8 | 13 | F8 | 13 | F8 | 14 | F9 |
| 8 | 111001 | 13 | F8 | 12 | F7.1 | 12 | F7.1 | 12 | F7.1 | 13 | F8 |
| 7.1 | 110001 | 12 | F7.1 | 11 | F6.3 | 11 | F6.3 | 11 | F6.3 | 12 | F7.1 |
| 6.3 | 110011 | 11 | F6.3 | 10 | F5.6 | 10 | F5.6 | 10 | F5.6 | 11 | F6.3 |
| 5.6 | 110010 | 10 | F5.6 | 9 | F5 | 9 | F5 | 9 | F5 | 10 | F5.6 |
| 5 | 111010 | 9 | F5 | 8 | F4.5 | 8 | F4.5 | 8 | F4.5 | 9 | F5 |
| 4.5 | 101010 | 8 | F4.5 | 7 | F4 | 0 | AE | 7 | F4 | 8 | F4.5 |
| 4 | 101110 | 7 | F4 | 6 | F3.5 | 7 | F4 | 6 | F3.5 | 7 | F4 |
| 3.5 | 101100 | 6 | F3.5 | 5 | F3.2 | 6 | F3.5 | 5 | F3.2 | 6 | F3.5 |
| 3.2 | 101101 | 5 | F3.2 | 4 | F2.8 | 5 | F3.2 | 4 | F3.2 | 5 | F3.2 |
| 2.8 | 101111 | 4 | F2.8 | 3 | F2.5 | 4 | F2.8 | 3 | F2.8 | 4 | F2.8 |
| 2.5 | 101011 | 3 | F2.5 | 2 | F2.2 | 3 | F2.5 | 2 | F2.5 | 3 | F2.5 |
| 2.2 | 111011 | 2 | F2.2 | 1 | F2 | 2 | F2.2 | 1 | F2.2 | 2 | F2.2 |
| 2 | 011011 | 1 | F2 | | | 1 | F2 | 0 | AE | 1 | F2 |

FIG. 18

| INITIAL STATE | | | | 3-A MODE | | 3-B MODE | |
|---|---|---|---|---|---|---|---|
| ROTATIONAL POSITION | ELECTRIC SIGNAL | POSITION NUMBER | UNIT NUMBER | POSITION NUMBER | UNIT NUMBER | POSITION NUMBER | UNIT NUMBER |
| A | 111110 | 0 | AE | 0 | AE | 0 | AE |
| 16 | 111100 | 19 | F16 | 0 | AE | 0 | AE |
| 14 | 110100 | 18 | F14 | 0 | AE | 0 | AE |
| 13 | 110110 | 17 | F13 | 0 | AE | 0 | AE |
| 11 | 110111 | 16 | F11 | 0 | AE | 0 | AE |
| 10 | 110101 | 15 | F10 | 0 | AE | 0 | AE |
| 9 | 111101 | 14 | F9 | 0 | AE | 0 | AE |
| 8 | 111001 | 13 | F8 | 0 | AE | 0 | AE |
| 7.1 | 110001 | 12 | F7.1 | 0 | AE | 0 | AE |
| 6.3 | 110011 | 11 | F6.3 | 0 | AE | 0 | AE |
| 5.6 | 110010 | 10 | F5.6 | 10 | F5.6 | 0 | AE |
| 5 | 111010 | 9 | F5 | 0 | AE | 0 | AE |
| 4.5 | 101010 | 8 | F4.5 | 0 | AE | 0 | AE |
| 4 | 101110 | 7 | F4 | 0 | AE | 7 | F4 |
| 3.5 | 101100 | 6 | F3.5 | 0 | AE | 0 | AE |
| 3.2 | 101101 | 5 | F3.2 | 0 | AE | 0 | AE |
| 2.8 | 101111 | 4 | F2.8 | 0 | AE | 0 | AE |
| 2.5 | 101011 | 3 | F2.5 | 0 | AE | 0 | AE |
| 2.2 | 111011 | 2 | F2.2 | 0 | AE | 0 | AE |
| 2 | 011011 | 1 | F2 | 0 | AE | 0 | AE |

FIG. 19

| INITIAL STATE | | | | 4-A MODE | | 4-B MODE | |
|---|---|---|---|---|---|---|---|
| ROTATIONAL POSITION | ELECTRIC SIGNAL | POSITION NUMBER | UNIT NUMBER | POSITION NUMBER | UNIT NUMBER | POSITION NUMBER | UNIT NUMBER |
| A | 111110 | 0 | AE | 10 | F5.6 | 7 | F4 |
| 16 | 111100 | 19 | F16 | 10 | F5.6 | 7 | F4 |
| 14 | 110100 | 18 | F14 | 10 | F5.6 | 7 | F4 |
| 13 | 110110 | 17 | F13 | 10 | F5.6 | 7 | F4 |
| 11 | 110111 | 16 | F11 | 10 | F5.6 | 7 | F4 |
| 10 | 110101 | 15 | F10 | 10 | F5.6 | 7 | F4 |
| 9 | 111101 | 14 | F9 | 10 | F5.6 | 7 | F4 |
| 8 | 111001 | 13 | F8 | 10 | F5.6 | 7 | F4 |
| 7.1 | 110001 | 12 | F7.1 | 10 | F5.6 | 7 | F4 |
| 6.3 | 110011 | 11 | F6.3 | 10 | F5.6 | 7 | F4 |
| 5.6 | 110010 | 10 | F5.6 | 10 | F5.6 | 7 | F4 |
| 5 | 111010 | 9 | F5 | 10 | F5.6 | 7 | F4 |
| 4.5 | 101010 | 8 | F4.5 | 10 | F5.6 | 7 | F4 |
| 4 | 101110 | 7 | F4 | 10 | F5.6 | 7 | F4 |
| 3.5 | 101100 | 6 | F3.5 | 10 | F5.6 | 7 | F4 |
| 3.2 | 101101 | 5 | F3.2 | 10 | F5.6 | 7 | F4 |
| 2.8 | 101111 | 4 | F2.8 | 10 | F5.6 | 7 | F4 |
| 2.5 | 101011 | 3 | F2.5 | 10 | F5.6 | 7 | F4 |
| 2.2 | 111011 | 2 | F2.2 | 10 | F5.6 | 7 | F4 |
| 2 | 011011 | 1 | F2 | 10 | F5.6 | 7 | F4 |

FIG. 20

| FIRST LENS UNIT ||||| SECOND LENS UNIT |||||
|---|---|---|---|---|---|---|---|---|---|
| INITIAL STATE |||| 2-A MODE || INITIAL STATE |||| 2-A MODE ||
| ROTATIONAL POSITION | POSITION NUMBER | UNIT NUMBER | | POSITION NUMBER | UNIT NUMBER | ROTATIONAL POSITION | POSITION NUMBER | UNIT NUMBER | POSITION NUMBER | UNIT NUMBER |
| A | 0 | AE | | | | A | 0 | AE | | |
| 16 | 19 | F16 | | 19 | F16 | 32 | 22 | F32 | 22 | F32 |
| 14 | 18 | F14 | | 18 | F14 | 29 | 21 | F29 | 21 | F29 |
| 13 | 17 | F13 | | 17 | F13 | 25 | 20 | F25 | 20 | F26 |
| 11 | 16 | F11 | | 16 | F11 | 22 | 19 | F22 | 19 | F22 |
| 10 | 15 | F10 | | 15 | F10 | 20 | 18 | F20 | 18 | F20 |
| 9 | 14 | F9 | | 14 | F9 | 18 | 17 | F18 | 17 | F18 |
| 8 | 13 | F8 | | 13 | F8 | 16 | 16 | F16 | 16 | F16 |
| 7.1 | 12 | F7.1 | | 12 | F7.1 | 14 | 15 | F14 | 15 | F14 |
| 6.3 | 11 | F6.3 | | 11 | F6.3 | 13 | 14 | F13 | 14 | F13 |
| 5.6 | 10 | F5.6 | | 10 | AE | 11 | 13 | F11 | 13 | F11 |
| 5 | 9 | F5 | | 9 | F5.6 | 10 | 12 | F10 | 12 | F10 |
| 4.5 | 8 | F4.5 | | 8 | F5 | 9 | 11 | F9 | 11 | F9 |
| 4 | 7 | F4 | | 7 | F4.5 | 8 | 10 | F8 | 10 | F8 |
| 3.5 | 6 | F3.5 | | 6 | F4 | 7.1 | 9 | F7.1 | 9 | F7.1 |
| 3.2 | 5 | F3.2 | | 5 | F3.5 | 6.3 | 8 | F6.3 | 8 | F6.3 |
| 2.8 | 4 | F2.8 | | 4 | F3.2 | 5.6 | 7 | F5.6 | 0 | AE |
| 2.5 | 3 | F2.5 | | 3 | F2.8 | 5 | 6 | F5 | 7 | F5.6 |
| 2.2 | 2 | F2.2 | | 2 | F2.5 | 4.5 | 5 | F4.5 | 6 | F5 |
| 2 | 1 | F2 | | 1 | F2.2 | 4 | 4 | F4 | 5 | F4.5 |
| | | | | | F2 | 3.5 | 3 | F3.5 | 4 | F4 |
| | | | | | | 3.2 | 2 | F3.2 | 3 | F3.5 |
| | | | | | | 2.8 | 1 | F2.8 | 2 | F3.2 |
| | | | | | | | | | 1 | F2.8 |

FIG. 21

| FIRST LENS UNIT ||||| SECOND LENS UNIT |||||
| INITIAL STATE ||| 3-A MODE || INITIAL STATE ||| 3-A MODE ||
| ROTATIONAL POSITION | POSITION NUMBER | UNIT NUMBER | POSITION NUMBER | UNIT NUMBER | POSITION NUMBER | ELECTRIC SIGNAL | UNIT NUMBER | POSITION NUMBER | UNIT NUMBER |
|---|---|---|---|---|---|---|---|---|---|
| A | 0 | AE | 0 | AE | A | 0 | AE | 0 | AE |
| 16 | 19 | F16 | 0 | AE | 32 | 22 | F32 | 0 | AE |
| 14 | 18 | F14 | 0 | AE | 29 | 21 | F29 | 0 | AE |
| 13 | 17 | F13 | 0 | AE | 25 | 20 | F25 | 0 | AE |
| 11 | 16 | F11 | 0 | AE | 22 | 19 | F22 | 0 | AE |
| 10 | 15 | F10 | 0 | AE | 20 | 18 | F20 | 0 | AE |
| 9 | 14 | F9 | 0 | AE | 18 | 17 | F18 | 0 | AE |
| 8 | 13 | F8 | 0 | AE | 16 | 16 | F16 | 0 | AE |
| 7.1 | 12 | F7.1 | 0 | AE | 14 | 15 | F14 | 0 | AE |
| 6.3 | 11 | F6.3 | 0 | AE | 13 | 14 | F13 | 0 | AE |
| 5.6 | 10 | F5.6 | 10 | F5.6 | 11 | 13 | F11 | 0 | AE |
| 5 | 9 | F5 | 0 | AE | 10 | 12 | F10 | 0 | AE |
| 4.5 | 8 | F4.5 | 0 | AE | 9 | 11 | F9 | 0 | AE |
| 4 | 7 | F4 | 0 | AE | 8 | 10 | F8 | 0 | AE |
| 3.5 | 6 | F3.5 | 0 | AE | 7.1 | 9 | F7.1 | 0 | AE |
| 3.2 | 5 | F3.2 | 0 | AE | 6.3 | 8 | F6.3 | 0 | AE |
| 2.8 | 4 | F2.8 | 0 | AE | 5.6 | 7 | F5.6 | 7 | F5.6 |
| 2.5 | 3 | F2.5 | 0 | AE | 5 | 6 | F5 | 0 | AE |
| 2.2 | 2 | F2.2 | 0 | AE | 4.5 | 5 | F4.5 | 0 | AE |
| 2 | 1 | F2 | 0 | AE | 4 | 4 | F4 | 0 | AE |
| | | | | | 3.5 | 3 | F3.5 | 0 | AE |
| | | | | | 3.2 | 2 | F3.2 | 0 | AE |
| | | | | | 2.8 | 1 | F2.8 | 0 | AE |

FIG. 22

| FIRST LENS UNIT | | | | | SECOND LENS UNIT | | | |
|---|---|---|---|---|---|---|---|---|
| | INITIAL STATE | | 4-A MODE | | INITIAL STATE | | 4-A MODE | |
| ROTATIONAL POSITION | POSITION NUMBER | UNIT NUMBER | POSITION NUMBER | UNIT NUMBER | ROTATIONAL POSITION | POSITION NUMBER | POSITION NUMBER | UNIT NUMBER |
| A | 0 | AE | 10 | F5.6 | A | 0 | 7 | F5.6 |
| 16 | 19 | F16 | 10 | F5.6 | 32 | 22 | 7 | F5.6 |
| 14 | 18 | F14 | 10 | F5.6 | 29 | 21 | 7 | F5.6 |
| 13 | 17 | F13 | 10 | F5.6 | 25 | 20 | 7 | F5.6 |
| 11 | 16 | F11 | 10 | F5.6 | 22 | 19 | 7 | F5.6 |
| 10 | 15 | F10 | 10 | F5.6 | 20 | 18 | 7 | F5.6 |
| 9 | 14 | F9 | 10 | F5.6 | 18 | 17 | 7 | F5.6 |
| 8 | 13 | F8 | 10 | F5.6 | 16 | 16 | 7 | F5.6 |
| 7.1 | 12 | F7.1 | 10 | F5.6 | 14 | 15 | 7 | F5.6 |
| 6.3 | 11 | F6.3 | 10 | F5.6 | 13 | 14 | 7 | F5.6 |
| 5.6 | 10 | F5.6 | 10 | F5.6 | 11 | 13 | 7 | F5.6 |
| 5 | 9 | F5 | 10 | F5.6 | 10 | 12 | 7 | F5.6 |
| 4.5 | 8 | F4.5 | 10 | F5.6 | 9 | 11 | 7 | F5.6 |
| 4 | 7 | F4 | 10 | F5.6 | 8 | 10 | 7 | F5.6 |
| 3.5 | 6 | F3.5 | 10 | F5.6 | 7.1 | 9 | 7 | F5.6 |
| 3.2 | 5 | F3.2 | 10 | F5.6 | 6.3 | 8 | 7 | F5.6 |
| 2.8 | 4 | F2.8 | 10 | F5.6 | 5.6 | 7 | 7 | F5.6 |
| 2.5 | 3 | F2.5 | 10 | F5.6 | 5 | 6 | 7 | F5.6 |
| 2.2 | 2 | F2.2 | 10 | F5.6 | 4.5 | 5 | 7 | F5.6 |
| 2 | 1 | F2 | 10 | F5.6 | 4 | 4 | 7 | F5.6 |
| | | | | | 3.5 | 3 | 7 | F5.6 |
| | | | | | 3.2 | 2 | 7 | F5.6 |
| | | | | | 2.8 | 1 | 7 | F5.6 |

CAMERA SYSTEM, CAMERA BODY, LENS UNIT, STOP ADJUSTMENT METHOD, AND PROGRAM

CROSS-REFERENCE TO RELATED APPLICATIONS

The present application is a Continuation of PCT International Application No. PCT/JP2018/020307 filed on May 28, 2018 claiming priorities under 35 U.S.C § 119(a) to Japanese Patent Application No. 2017-159561 filed on Aug. 22, 2017. Each of the above applications is hereby expressly incorporated by reference, in its entirety, into the present application.

BACKGROUND OF THE INVENTION

1. Field of the Invention

The present invention relates to a camera system, a camera body, a lens unit, a stop adjustment method, and a program.

2. Description of the Related Art

A lens unit having a stop ring for adjusting an aperture value is known as a lens unit mounted on a camera body such as a single-lens reflex digital camera. For example, JP2005-292325A discloses a lens unit that allows a user to select an auto indication corresponding to an auto mode for automatically adjusting an aperture value, and a plurality of aperture values corresponding to a manual mode in which the user determines an aperture value, in accordance with a rotational position of the stop ring.

SUMMARY OF THE INVENTION

However, in JP2005-292325A, a sort order of an auto indication and a plurality of aperture values is fixed for each lens unit. Therefore, the user is unable to change the sort order of the auto indication and the plurality of aperture values.

The present invention has been made in view of such situations, and its object is to provide a camera system, a camera body, a lens unit, a stop adjustment method, and a program capable of allowing a user to change a sort order of a single auto indication and a plurality of aperture values.

According to a first aspect, there is provided a camera system comprising: a lens unit that includes a stop ring selecting a single auto indication corresponding to an auto mode and a plurality of aperture values corresponding to a manual mode in accordance with a rotational position; and a camera body on which the lens unit can be interchangeably mounted. The camera body includes a display section which is capable of rewriting a sort order of the single auto indication and the plurality of aperture values, and a camera control section which executes a change mode for changing a sort order of the plurality of aperture values and the single auto indication corresponding to the rotational position of the stop ring.

In the camera system according to a second aspect, the change mode includes a plurality of sub change modes.

In the camera system according to a third aspect, the plurality of sub change modes include a first change mode including reversal of the sort order of the plurality of aperture values, a second change mode for changing a position of the single auto indication, a third change mode for changing to the single auto indication and a single aperture value from the plurality of aperture values, and a fourth change mode for changing to only one aperture value from the plurality of aperture values and the single auto indication.

In the camera system according to a fourth aspect, the camera control section determines one of the single auto indication and the plurality of aperture values corresponding to a rotational position of the stop ring in accordance with the plurality of sub change modes.

In the camera system according to a fifth aspect, the lens unit includes a position detection section that detects a rotational position of the stop ring, a stop unit that adjusts a stop diameter, and a lens control section that drives the stop unit, and the camera control section transmits a stop control signal for driving the stop unit to the lens control section.

In the camera system according to a sixth aspect, the stop control signal includes a change mode control signal corresponding to the change mode and an initial state control signal corresponding to the sort order in an initial state.

In the camera system according to a seventh aspect, the lens control section stores a correspondence relationship between a position number corresponding to a rotational position of the stop ring and a stop diameter corresponding to the position number, and transmits the position number to the camera control section.

In the camera system according to an eighth embodiment, the camera control section calculates the position number as a new position number in accordance with an algorithm in the change mode.

According to a ninth aspect, there is provided a camera body on which a lens unit including a stop ring selecting a single auto indication corresponding to an auto mode and a plurality of aperture values corresponding to a manual mode in accordance with a rotational position can be interchangeably mounted, the camera body comprising a camera control section that executes a change mode for changing a sort order of the single auto indication and the plurality of aperture values corresponding to the rotational position of the stop ring.

According to a tenth aspect, there is provided a lens unit comprising: a stop ring that selects a plurality of aperture values corresponding to a manual mode and a single auto indication corresponding to an auto mode in accordance with a rotational position; and a lens control section that executes a change mode for changing a sort order of the plurality of aperture values and the single auto indication corresponding to the rotational position of the stop ring.

According to an eleventh aspect, there is provided a stop adjustment method comprising: mounting a lens unit, which includes a stop ring selecting a single auto indication corresponding to an auto mode and a plurality of aperture values corresponding to a manual mode in accordance with a rotational position, on a camera body, and acquiring a sort order of the plurality of aperture values and the single auto indication corresponding to the rotational position of the stop ring of the lens unit in an initial state; selecting a change mode for changing the sort order in the initial state; and changing the sort order in the initial state in accordance with the change mode.

According to a twelfth aspect, there is provided a program for causing a camera system to execute: mounting a lens unit, which includes a stop ring selecting a single auto indication corresponding to an auto mode and a plurality of aperture values corresponding to a manual mode in accordance with a rotational position, on a camera body, and acquiring a sort order of the plurality of aperture values and the single auto indication corresponding to the rotational position of the stop ring of the lens unit in an initial state; and selecting a change mode for changing the sort order in the initial state and thereafter changing the sort order in the initial state in accordance with the change mode.

According to the present invention, a user is able to change the sort order of the single auto indication and the plurality of aperture values.

BRIEF DESCRIPTION OF THE DRAWINGS

FIG. 2 is an external perspective view of a lens unit and a camera body.

FIG. 6 is an explanatory diagram for explaining an electrical signal acquired from an electrical contact point and a code plate.

FIG. 8 is a table showing a configuration of a correspondence table.

FIG. 14 is a table showing calculation results in a first change mode.

FIG. 16 is a table showing calculation results in the second change mode.

FIG. 18 is a table showing calculation results in the third change mode.

FIG. 19 is a table showing calculation results in a fourth change mode.

FIG. 20 is a table showing calculation results in the second change mode after the lens unit is replaced.

FIG. 21 is a table showing calculation results in the third change mode after the lens unit is replaced.

FIG. 22 is a table showing calculation results in the fourth change mode after the lens unit is replaced.

DESCRIPTION OF THE PREFERRED EMBODIMENTS

Hereinafter, preferred embodiments of the present invention will be described with reference to the accompanying drawings. The present invention will be described through the following preferred embodiments.

Various modifications can be made by various techniques without departing from the scope of the present invention, and other embodiments than the above embodiments can be applied. Accordingly, all modifications within the scope of the present invention are included in the claims.

Figure 1:
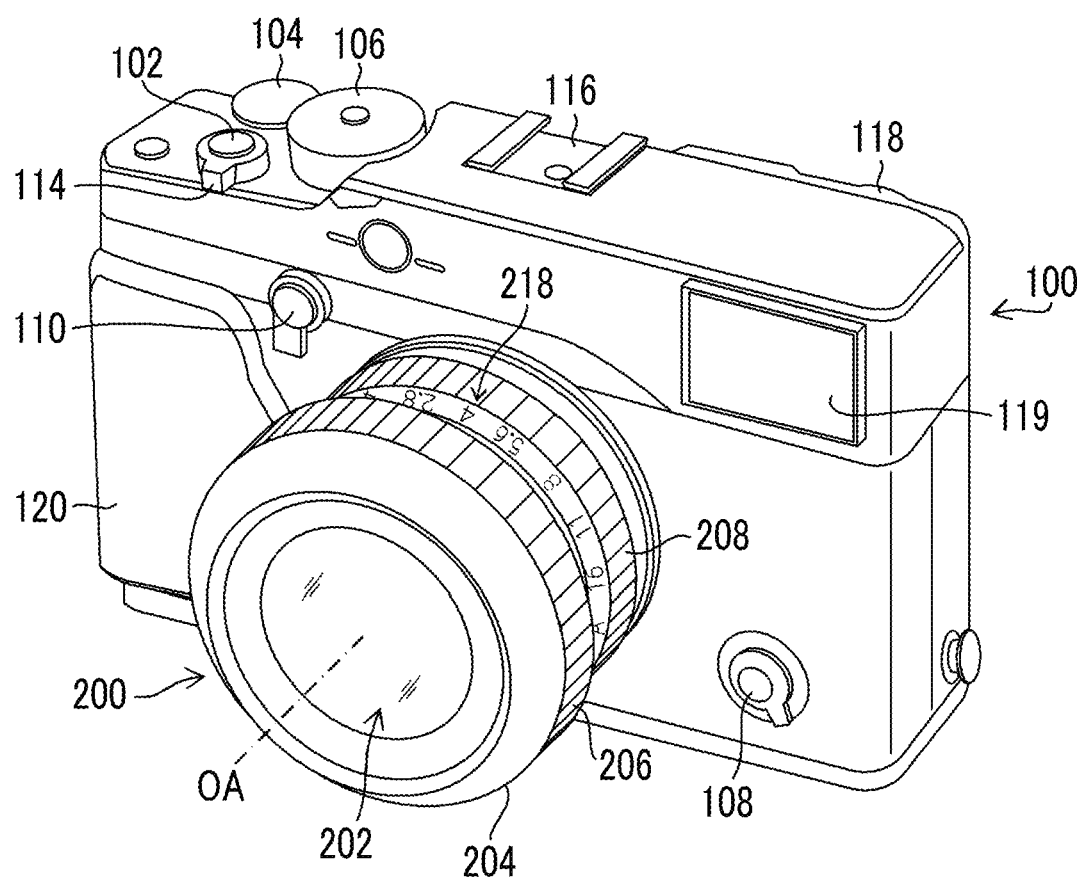
FIG. 1 is an external perspective view of a camera system.

A camera system according to an embodiment will be described with reference to the drawings. FIG. 1 is an external perspective view of a camera unit in which a lens unit and a camera body are mounted, and FIG. 2 is an external perspective view of the lens unit and the camera body.

In this specification, the direction along the optical axis OA (the Z direction in FIG. 1) is the front-rear direction, and a direction toward the subject side is the front direction. Further, in a plane orthogonal to the optical axis OA, a direction (the X direction in FIG. 1) along the long side of an image sensor 138 (refer to FIG. 2) is a horizontal direction or a right-left direction, and a direction (the Y direction in FIG. 1) along the short side of the image sensor 138 is a vertical direction or an up-down direction.

As shown in FIG. 1, the camera system 1 includes a camera body 100 and a lens unit 200. The camera system 1 of the embodiment is an interchangeable lens type camera system 1, and the lens unit 200 is attachably and detachably mounted on the camera body 100 so as to be replaceable.

As shown in FIGS. 1 and 2, the camera body 100 has a rectangular box shape of which the thickness in the front-rear direction is smaller than the height thereof in the up-down direction. As shown in FIG. 1, the camera body 100 comprises, as operation members, a release switch 102, an exposure compensation dial 104, a shutter speed dial 106, a focus mode switching lever 108, a viewfinder switching lever 110, a power lever 114, and the like. The release switch 102, the exposure compensation dial 104, and the shutter speed dial 106 are arranged on the upper side of the camera body 100.

The release switch 102 is a two-stage stroke type switch that is capable of so-called "half pressing" and "full pressing". The release switch 102 outputs an S1-on signal through half pressing, and outputs an S2-on signal through full pressing which is more pressed than half pressing. The camera system 1 performs imaging preparation processing such as auto focus adjustment control (AF processing) or auto exposure control in a case where the S1-on signal is output from the release switch 102, and performs imaging processing in a case where the S2-on signal is output.

The camera body 100 comprises a hot shoe 116, an electronic viewfinder 118, an optical viewfinder window 119, and a grip 120. The grip 120 is disposed on the left side of the camera body 100. A user holds the grip 120 and performs a release operation through the release switch 102.

As shown in FIG. 2, the camera body 100 comprises a lens attachment/detachment button 112 and a body mount 122. As shown in FIG. 2, the body mount 122 is a mount portion for mounting the lens unit 200. The body mount 122 has a bayonet structure.

The body mount 122 is provided with a plurality of body signal contact points 136 along the inner periphery of the opening in order to be electrically connected to the lens unit 200. The body signal contact points 136 are composed of, for example, pins and are biased to the front side of the camera body 100 by biasing means (not shown in the drawing).

As shown in FIG. 2, an image sensor 138 exposed from the opening of the body mount 122 is disposed in the camera body 100. The image sensor 138 converts an object image formed through the lens unit 200 into an electric signal and outputs the electric signal. As the image sensor 138, a known image sensor such as a CCD image sensor (CCD: Charged Coupled Device) or a CMOS image sensor (CMOS: Complementary Metal Oxide Semiconductor) is used.

A lock pin 132 is disposed on the body mount 122. The lock pin 132 is biased forward by the biasing means (not shown in the drawing). In conjunction with the pressing operation of the lens attachment/detachment button 112, the lock pin 132 can be retracted backward.

As shown in FIGS. 1 and 2, the lens unit 200 of the embodiment includes an optical system 202 including at least one lens, a lens barrel 204 that houses the optical system 202, a focus ring 206, and a stop ring 208, and a lens mount 210. The optical system 202 including a lens means an assembly of optical members for forming an image of an object by transmitting light through the lens. The lens barrel 204 is a substantially cylindrical tubular body that is able to house the optical system 202, and the shape thereof is not limited as long as the optical system 202 can be housed.

The lens mount 210 is provided on one end side of the lens barrel 204 of the lens unit 200, that is, on the rear side of the lens barrel 204. The lens mount 210 has a bayonet structure, and is attachably and detachably mounted on the body mount 122 having the bayonet structure.

As shown in FIG. 2, the lens mount 210 comprises a mount cover 212. A plurality of lens signal contact points 214 are arranged on the mount cover 212 for electrical connection with the camera body 100.

The stop ring 208 of the lens unit 200 has an annular shape, and is disposed on the outer peripheral surface of the lens barrel 204 so as to be rotatable around the optical axis OA as the axis. The stop ring 208 is an operation member for the user to manually rotate and control the stop. The stop ring 208 comprises an indication area 218 on its peripheral surface. The indication area 218 comprises a single auto indication 218A corresponding to an auto mode and exposure amount indications 218B including a plurality of aperture values corresponding to a manual mode. The lens barrel 204 comprises an index 222. In order to align the index 222 with the indication of either the single auto indication 218A in the indication area 218 or the exposure amount indications 218B including the plurality of aperture values, the stop ring 208 is rotated. In a case where "A" which is the auto indication 218A is selected by the stop ring 208, that is, in a case where the auto indication 218A and the index 222 are aligned, auto exposure (AE) processing in the auto mode can be set.

In the exposure amount indications 218B corresponding to the manual mode, "16, 11, 8, 5.6, 4, 2.8, and 2", which are F numbers as the plurality of aperture values, are sequentially arranged. In a case where a certain aperture value of the exposure amount indications 218B is selected by the stop ring 208, that is, in a case where a certain aperture value of the plurality of aperture values of the exposure amount indications 218B is aligned with the index 222, the aperture value can be selectively selected. The F number is obtained by the ratio (f/D) of the focal length f to the effective diameter D of the lens.

Further, as will be described later, the stop ring 208 is adjusted to a predetermined position (a certain position obtained by dividing the interval into three equal parts) between two adjacent aperture values of the exposure amount indications 218B. Therefore, the aperture value can be set selectively in ⅓ step increments.

Figure 3:
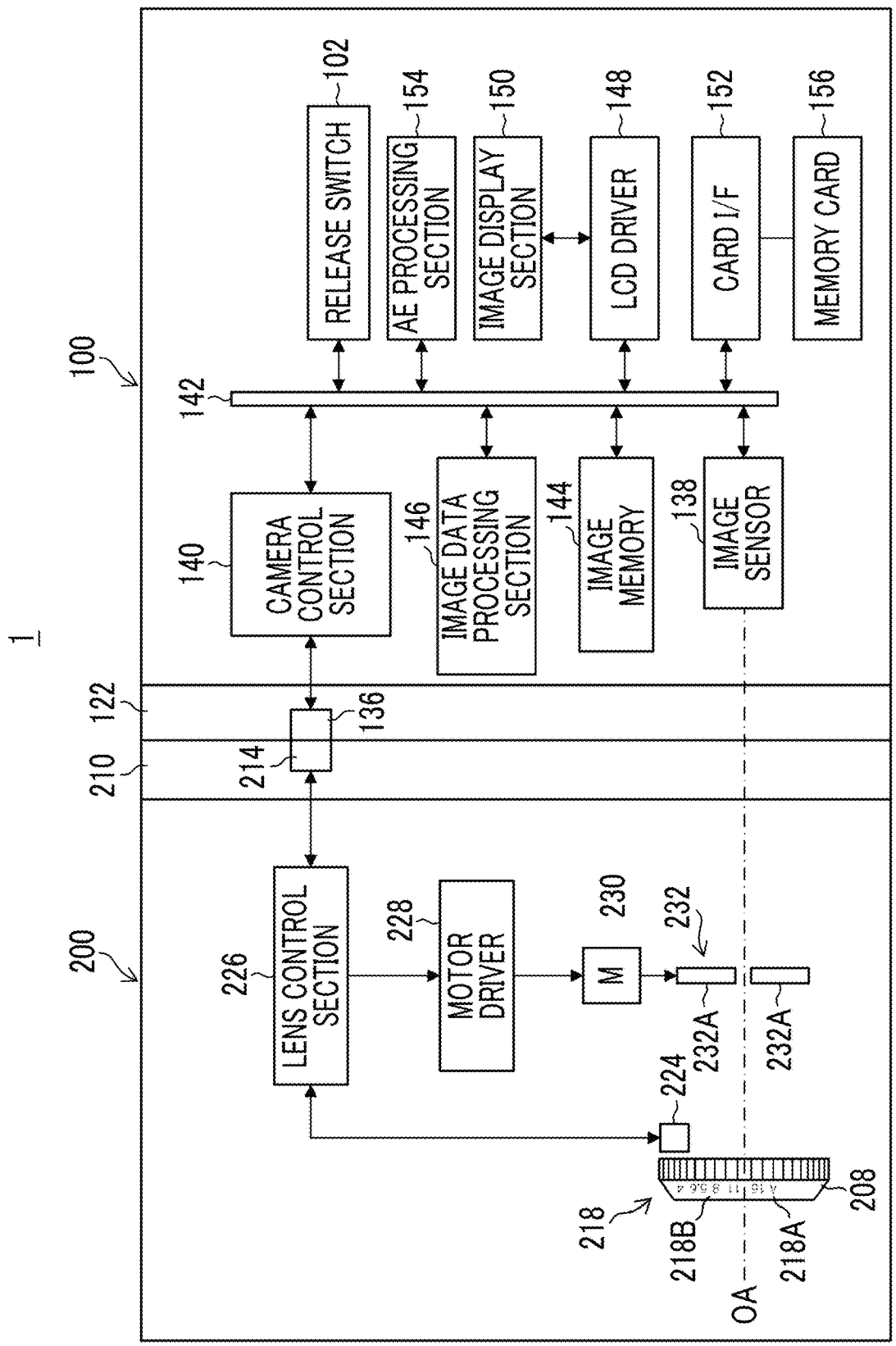
FIG. 3 is a block diagram showing a configuration of the camera system.

FIG. 3 is a block diagram showing a configuration of the camera system 1. As shown in FIG. 3, the lens unit 200 comprises a stop ring 208, a lens mount 210, lens signal contact points 214, a position detection section 224, a lens control section 226, a motor driver 228, a motor (M) 230, a stop unit 232, and the like.

The lens control section 226 includes a micro computer comprising a central processing unit (CPU), a read only memory (ROM) which stores parameters and programs used in the CPU, a random access memory (RAM) which is used as a work memory for the CPU, and the like (any of those is not shown in the drawing). The lens control section 226 controls the sections of the lens unit 200. The position detection section 224 and the motor driver 228 are connected to the lens control section 226.

The lens control section 226 functions as a stop control section that controls the stop diameter of the stop unit 232 and a rotational position detection section that detects a rotational position of the stop ring 208 by obtaining a signal from the position detection section 224, on the basis of a control signal from the camera control section 140. Information about the rotational position of the stop ring 208 detected by the lens control section 226 is input to the camera control section 140 of the camera body 100 through the lens signal contact points 214 and the body signal contact points 136.

The stop unit 232 has a plurality of stop leaf blades 232A. By driving the motor 230, the plurality of stop leaf blades 232A are moved, and the amount of light incident on the image sensor 138 is adjusted. The motor driver 228 controls the driving of the motor 230 on the basis of the control of the lens control section 226.

The position detection section 224 is a position detection section for detecting the rotational position of the stop ring 208. A detection signal from the position detection section 224 is input to the lens control section 226. The lens control section 226 detects the rotational position of the stop ring 208 on the basis of the detection signal input from the position detection section 224. By detecting the rotational position of the stop ring 208, it is possible to obtain information indicating whether the index 222 is aligned with the single auto indication 218A or the exposure amount indications 218B including a plurality of aperture values. Based on this information, any one of the AE processing and the aperture value is selected during imaging processing.

As shown in FIG. 3, the camera body 100 comprises a release switch 102, a body mount 122, body signal contact points 136, an image sensor 138, a camera control section 140, a bus line 142, an image memory 144, an image data processing section 146, an LCD driver 148, a display section 150, a card interface (I/F) 152, an AE processing section 154, and the like.

The camera control section 140 comprises a CPU, a ROM (non-transitory computer-readable recording medium) that stores programs and parameters used by the CPU, a RAM (any of those is not shown in the drawing) used as a work memory for the CPU, and the like. The camera control section 140 controls the sections of the camera body 100 and the lens unit 200 mounted on the camera body 100. The camera control section 140 receives the S1 signal and the S2 signal from the release switch 102. The camera control section 140 is electrically connected to the body signal contact points 136.

The image sensor 138 comprises a denoising circuit, an auto gain controller, and a signal processing circuit such as an analog/digital (A/D) conversion circuit (any of those is not shown in the drawing). The denoising circuit performs denoising processing on the imaging signal. The auto gain controller amplifies a level of the imaging signal to an optimum value. The A/D conversion circuit converts the imaging signal into a digital signal and outputs the digital signal from the image sensor 138 to the bus line 142. The electrical signal of the image sensor 138 is image data having one color signal for each pixel, so-called RAW data.

The image memory 144 stores image data for one frame which is output to the bus line 142. The image data processing section 146 reads image data for one frame from the image memory 144 and performs known image processing such as matrix calculation, demosaic processing, y correction, luminance/color difference conversion, and resizing processing.

The LCD driver 148 sequentially inputs image data for one frame processed by the image data processing section 146 to the display section 150. The display section 150 sequentially displays live view images with a constant period. The card I/F 152 is incorporated in a card slot (not shown) provided in the camera body 100. The card I/F 152 is electrically connected to the memory card 156 inserted into the card slot. The card I/F 152 stores the image data processed by the image data processing section 146 in the memory card 156. In a case where the image data stored in the memory card 156 is reproduced and displayed, the card I/F 152 reads the image data from the memory card 156.

The camera control section 140 transmits a control signal for operating the stop unit 232 to the lens control section 226 in accordance with the rotational position of the stop ring 208.

In a case where the rotational position of the stop ring 208 is positioned at the auto indication 218A, the AE processing is executed. The AE processing section 154 calculates an integrated value of the color signals from the image data for one frame. The camera control section 140 calculates an exposure value on the basis of the integrated value calculated for each image for one frame, and determines a shutter speed and an exposure amount from the exposure value in accordance with a predetermined program diagram. Then, the camera control section 140 controls driving of a shutter motor (not shown) such that the determined shutter speed is obtained, and transmits a control signal to the lens control section 226. The lens control section 226 controls the motor driver 228 on the basis of the control signal so as to operate the stop unit 232. The stop unit 232 is changed to have a stop diameter for obtaining the determined exposure amount.

In a case where the rotational position of the stop ring 208 is positioned at the exposure amount indication 218B, the camera control section 140 transmits a control signal to the lens control section 226. The lens control section 226 controls the motor driver 228 on the basis of the control signal, such that the stop unit 232 is changed to have a stop diameter at which an exposure amount corresponding to the rotational position of the stop ring 208 is obtained.

Next, the position detection section 224 detecting the rotational position of the stop ring 208 shown in FIG. 3 will be described with reference to FIGS. 4, 5, and 6.

Figure 4:
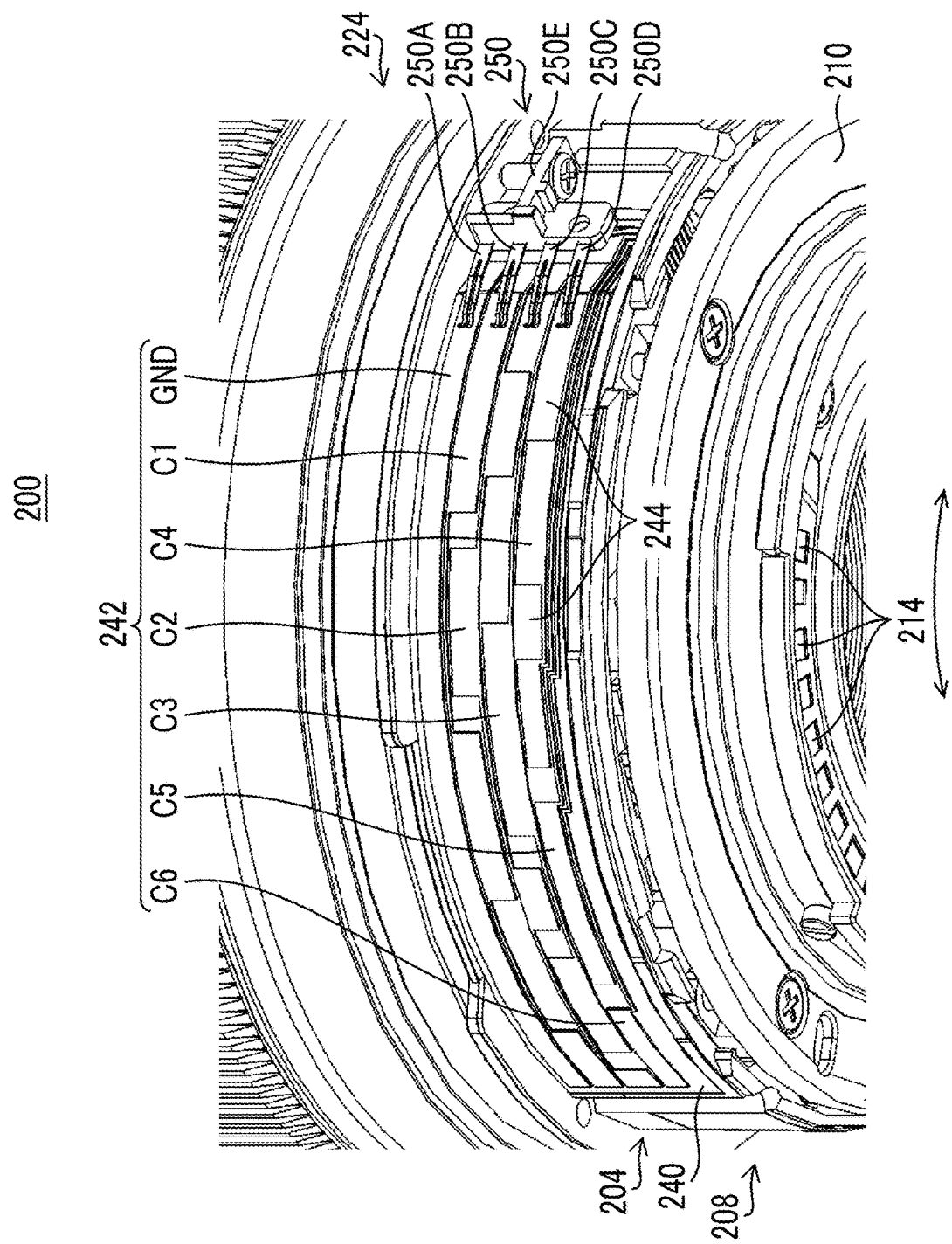
FIG. 4 is an enlarged perspective view showing a configuration of a position detection section provided in the lens unit.

FIG. 4 is an enlarged perspective view showing a configuration of the position detection section 224 provided in the lens unit 200. As shown in FIG. 4, the position detection section 224 includes a code plate 240 and an electrical contact point 250 that changes the position of contact with the code plate 240 in accordance with the rotation of the stop ring 208. The code plate 240 is mounted on the outer peripheral surface of the lens barrel 204. The code plate 240 comprises a conductive portion 242 that is composed of circuit wirings GND, C1, C2, C3, C4, C5, and C6, and a non-conductive portion 244 that is not composed of circuit wirings GND, C1, C2, C3, C4, C5, and C6.

The electrical contact point 250 comprises four sliding segments 250A, 250B, 250C, and 250D. The electrical contact point 250 is mounted on the stop ring 208 through a screw 250E. As the stop ring 208 rotates, the electrical contact point 250 moves while sliding on the code plate 240 in the directions indicated by the arrows. The electrical contact point 250 may be movable relative to the code plate 240.

Figure 5:
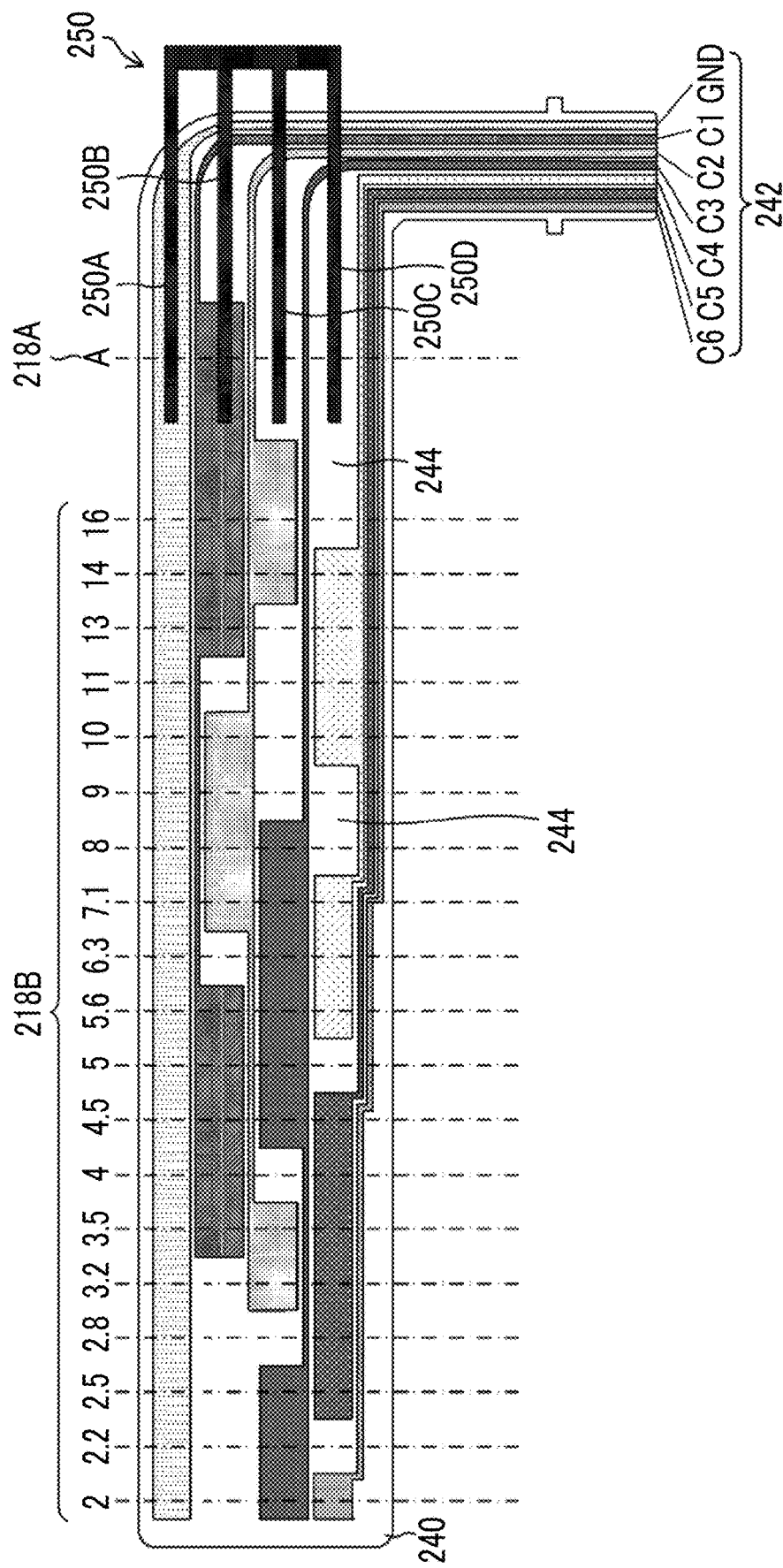
FIG. 5 is a diagram showing a relationship of a position of contact between an electrical contact point and a code plate and an auto indication and exposure amount indications that can be selected by a stop ring in an indication area.

FIG. 5 is a diagram showing the relationship between the position of contact between the code plate 240 and the electrical contact point 250 and the auto indication 218A and the exposure amount indications 218B in the indication area 218 that can be selected by the stop ring 208. As shown in FIG. 5, the stop ring 208 of the embodiment is capable of selecting any one of "A" of the single auto indication 218A and 19-step aperture values of "16", "14", "13", "11", "10", "9", "8", "7.1", "6.3", "5.6", "5", "4.5", "4", "3.5", "3.2", "2.8", "2.5", "2.2", and "2" of the exposure amount indications 218B. Different electrical signals are output in accordance with the position of contact between the electrical contact point 250 and the code plate 240. The lens control section 226 (not shown in the drawing) is able to detect an electrical signal from the electrical contact point 250 and the code plate 240 and obtain information about the rotational position of the stop ring 208. It is detected whether the rotational position of the stop ring 208 is a position of the single auto indication 218A in the indication area 218 or a position of the exposure amount indications 218B including the plurality of aperture values.

In the embodiment, a ground potential as a reference is applied to the circuit wiring GND. A potential (for example, a positive potential) different from the ground potential is applied to the circuit wirings C1, C2, C3, C4, C5, and C6.

A ground potential or the different potential is output from the circuit wirings GND, C1, C2, C3, C4, C5, and C6, respectively, in accordance with the position of the electrical contact point 250 and the code plate 240, that is, the position of contact of the sliding segments 250A, 250B, 250C, and 250D and the circuit wirings GND, C1, C2, C3, C4, C5, and C6. In the embodiment, the signal of the ground potential is output as "0" and the signal of the different potential is output as "1".

As shown in FIG. 5, in a case where the electrical contact point 250 is at the position of "A" of the single auto indication 218A, the circuit wiring GND and the circuit wiring C1 are electrically connected, and the circuit wiring C1 is at the ground potential. The potential signal which is output from the circuit wiring C1 is "0". On the other hand, since the circuit wirings C2, C3, C4, C5, and C6 are not electrically connected to the circuit wiring GND, the potential signal which is output from the circuit wirings C2, C3, C4, C5, and C6 is "1".

In a case where the electrical contact point 250 is at the position of "16" as one aperture value in the exposure amount indications 218B, the circuit wiring GND and the circuit wiring C1 are electrically connected, and the circuit wiring GND and the circuit wiring C2 are electrically connected. The circuit wiring C1 and the circuit wiring C2 are at the ground potential. The potential signal which is output from the circuit wiring C1 and the circuit wiring C2 is "0". On the other hand, since the circuit wirings C3, C4, C5, and C6 are not electrically connected to the circuit wiring GND, the potential signal which is output from the circuit wirings C2, C3, C4, C5, and C6 is "1".

Similarly, signals having different potentials are output in response to a plurality of remaining aperture values ("14", "13", "11", "10", "9", "8", "7.1", "6.3", "5.6", "5", "4.5", "4", "3.5", "3.2", "2.8", "2.5", "2.2", and "2").

FIG. 6 is an explanatory diagram for explaining a relationship between the auto indication 218A and the plurality of aperture values of the exposure amount indications 218B and electrical signals acquired from the code plate 240 and the electrical contact points 250. As shown in the table of FIG. 6, in a case where the stop ring 208 is positioned at "A" as the auto indication 218A, the electrical signal pattern at the rotational position of the stop ring 208 is "111110". In a case where the stop ring 208 is positioned at "16" on the exposure amount indications 218B, the electrical signal at the rotational position of the stop ring 208 is "111100". The table in FIG. 6 further shows electric signals corresponding to aperture values of "14", "13", "11", "10", "9", "8", "7.1", "6.3", "5.6", "5", "4.5", "4", "3.5", "3.2", "2.8", "2.5", "2.2", and "2".

As shown in the table of FIG. 6, adjacent electrical signals are composed of gray codes that are changed by one bit at a time.

As the stop ring 208 rotates, two or more bits change simultaneously between adjacent electrical signals. Then, in a case where there is a time difference in signal change of two or more bits, the lens control section 226 (not shown in the drawing) is likely to erroneously recognize the pattern of the electrical signal. The gray code prevents the lens control section 226 from erroneously recognizing the pattern of the electrical signal.

The gray code is realized by electrical contact between the arrangement pattern of the circuit wirings GND, C1, C2, C3, C4, C5, and C6 of the code plate 240 and the sliding sections 250A, 250B, 250C and 250D of the electrical contact point 250.

Next, the operation of the camera system 1 of an embodiment will be described. Examples of the lens unit 200 mounted on the camera body 100 include a lens unit 200 that switches between the single auto indication 218A and the 19-step exposure amount indications 218B through the stop ring 208 shown in FIGS. 5 and 6.

The lens unit 200 comprises a position detection section 224 that detects the rotational position of the single auto indication 218A and the 19-step exposure amount indications 218B. The rotational position of the stop ring 208 and the electrical signal corresponding to the rotational position generated by the position detection section 224 are physically determined for each lens unit 200.

Figure 7:
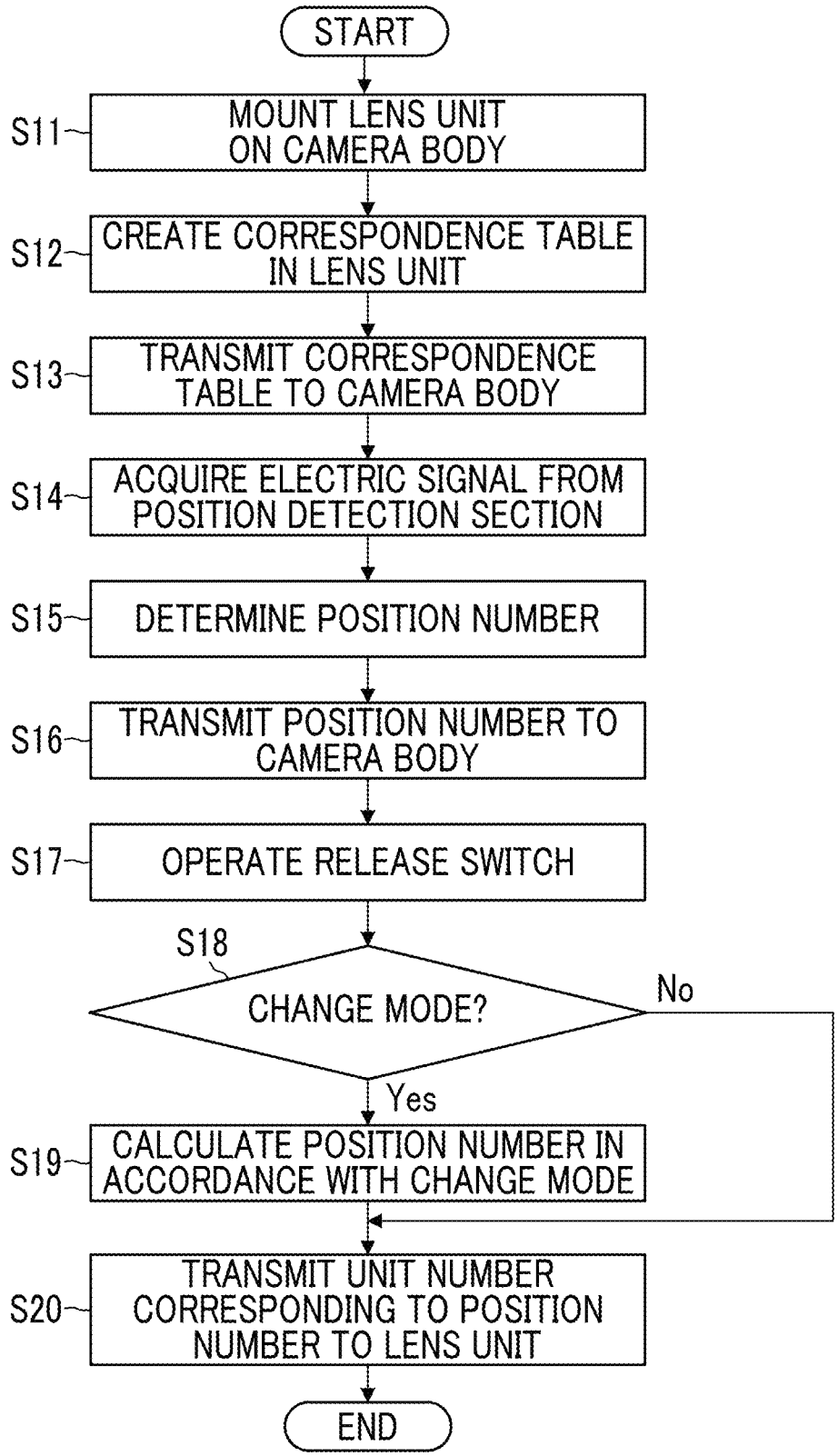
FIG. 7 is a flowchart showing operations.

FIG. 7 is a flowchart showing the overall operation of the camera system 1 showing an example of the stop adjustment method. First, the lens unit 200 is mounted on the camera body 100 (step S11).

Next, in a case where the power of the camera body 100 is turned on, the lens control section 226 of the lens unit 200 creates a correspondence table in the initial state of the lens unit from information stored in an internal memory thereof (step S12).

FIG. 8 shows a configuration of the correspondence table. The correspondence table includes a correspondence relationship in which the rotational position of the stop ring 208 and the electrical signal are associated with each other. The correspondence relationship between the rotational position and the electrical signal is uniquely determined by the configuration of the lens unit 200.

Further, the position numbers of (0), (19), (18), (17), (16), (15), (14), (13), (12), (11), (10), (9), (8), (7), (6), (5), (4), (3), (2), and (1) are respectively allocated to "A", "16", "14", "13", "11", "10", "9", "8", "7.1", "6.3", "5.6", "5", "4.5", "4", "3.5", "3.2", "2.8", "2.5", "2.2", and "2" each indicating the rotational position of the stop ring 208. Each position number is applied as information for specifying the rotational position of the stop ring 208 between the camera body 100 and the lens unit 200. The allocation of position numbers will be described later.

Furthermore, the position numbers of (0), (19), (18), (17), (16), (15), (14), (13), (12), (11), (10), (9), (8), (7), (6), (5), (4), (3), (2), and (1) are respectively associated with unit numbers of "AE", "F16", "F14", "F13", "F11", "F10", "F9", "F8", "F7.1", "F6.3", "F5.6", "F5", "F4.5", "F4", "F3.5", "F3.2", "F2.8", "F2.5", "F2.2", and "F2". Each unit number corresponds to the size of the stop diameter of the stop leaf blade 232A of the stop unit 232 and is applied as information for controlling the stop unit 232.

Next, a correspondence table is transmitted from the lens unit 200 to the camera body 100 as the characteristic information of the lens unit 200 (step S13). The lens control section 226 transmits information about the correspondence table to the camera control section 140 through the lens signal contact points 214 and body signal contact points 136.

In the flowchart of FIG. 7, the case where the lens control section 226 creates the correspondence table has been described. The present invention is not limited to this, and the camera control section 140 is able to create the correspondence table. Although the lens unit 200 has an electric signal pattern, even in a case where the lens control section 226 is unable to create the correspondence table, the creation of the correspondence table can also be handled by the camera body 100.

Next, in the lens unit 200, the lens control section 226 acquires an electrical signal corresponding to the current rotational position of the stop ring 208 from the position detection section 224 (step S14). For example, in a case where the stop ring 208 is at the rotational position of "16", an electrical signal "111100" is input from the position detection section 224 to the lens control section 226.

Next, the lens control section 226 determines a position number on the basis of the electrical signal from the position detection section 224 (step S15). The lens control section 226 determines a position number corresponding to the electrical signal from the position detection section 224 using, for example, the correspondence table. In a case where the electrical signal is "111100", the lens control section 226 determines that the position number is (19).

Next, the position number is transmitted from the lens unit 200 to the camera body 100 (step S16). The lens control section 226 transmits the determined position number to the camera control section 140 through the lens signal contact points 214 and the body signal contact points 136. The position number (19) corresponding to the rotational position of "16" of the stop ring 208 is transmitted from the lens control section 226 to the camera control section 140.

Next, the release switch 102 of the camera body 100 is operated to perform imaging processing (step S17). The release switch 102 of the camera body 100 is subjected to an operation such as "half pressing" or "full pressing".

Next, whether or not the change mode is applied and the type of the change mode are confirmed (step S18). In a case where the release switch 102 is operated, the camera control section 140 confirms whether or not the change mode is applied and the type of the change mode. The change mode means a state in which the sort order in the stop ring 208 is changed. In a case where it is determined that the change mode is applied, it is determined that the sort order in the stop ring 208 is changed. Further, in a case where the change mode includes a plurality of sub change modes, the camera control section 140 confirms the type of the change mode, that is, which sub change mode is the change mode. The sub change mode means the type of sort order in the stop ring 208.

In a case where it is determined in step S18 that the change mode is not applicable, that is, the determination result is "No", the unit number corresponding to the position number acquired in step S16 is transmitted from the camera body 100 to the lens unit 200 (step S20). For example, in a case where the position number (19) is transmitted in step S16, the camera control section 140 selects the unit number "F16" corresponding to the position number (19), and the unit number "F16" is transmitted to the lens control section 226 as a stop control signal through the body signal contact points 136 and the lens signal contact points 214. The lens control section 226 controls the motor driver 228 on the basis of the unit number "F16", and the motor driver 228 controls the motor 230. The stop leaf blade 232A of the stop unit 232 is driven so as to have a stop diameter of an aperture value "16". Since the change mode is not applied, the stop control signal is an initial state control signal.

Next, in a case where the change mode is applied in step S18 in which "whether or not the change mode is applied and the type of the change mode are confirmed", that is, in a case where the determination result is "Yes", the camera control section 140 determines whether or not the change mode is applied, and specifies the sub change mode.

Subsequently, the position number is calculated in accordance with the change mode (step S19). The camera control section 140 calculates the position number acquired in step S16 as a new position number in accordance with an algorithm corresponding to the change mode. The algorithm corresponding to the change mode is stored as a program in the ROM of the camera control section 140, and the CPU of the camera control section 140 executes the program.

For example, in a case where the position number (19) is transmitted in step S16, the camera control section 140 calculates the position number (19) as a new position number (2) in accordance with an algorithm corresponding to a certain change mode. The camera control section 140 selects the unit number "F2" corresponding to the position number (2), and the unit number "F2" is transmitted to the lens control section 226 as a stop control signal through the body signal contact points 136 and the lens signal contact points 214. The lens control section 226 controls the motor driver 228 on the basis of the unit number "F2", and the motor driver 228 controls the motor 230. The stop leaf blade 232A of the stop unit 232 is driven so as to have a stop diameter of an aperture value "2". In a case where the change mode is applied, even in a case where the stop ring 208 is aligned with the rotational position of "16", in actual imaging, the stop unit 232 is driven such that the aperture value of the stop ring 208 is not "16" and the aperture value after application of the change mode is "2". That is, the camera system 1 is able to capture images not in the sort order of the aperture values of the stop ring 208 but in the changed sort order. Since the change mode is applied, the stop control signal becomes a change mode control signal. The stop control signal includes the change mode control signal and the initial state control signal.

Figure 9:
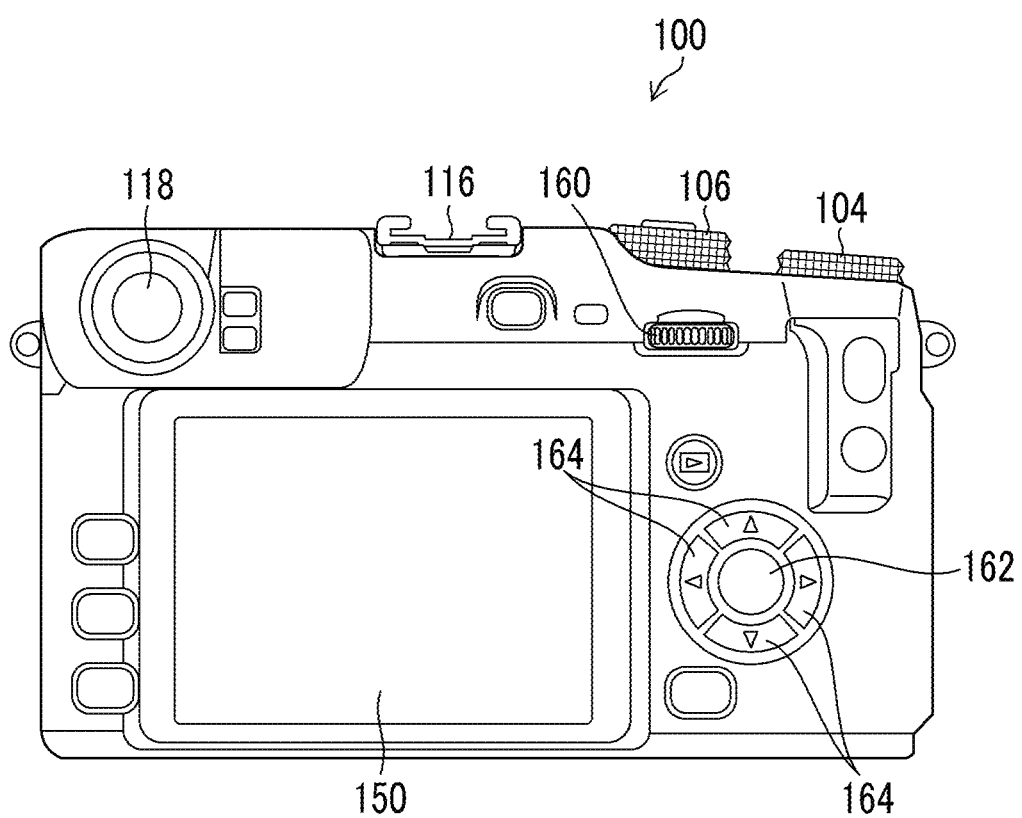
FIG. 9 is a rear view showing an external configuration of a camera body.

Next, a procedure for the user to change the sort order will be described. FIG. 9 is a rear view showing an external configuration of the camera body 100. As shown in FIG. 9, the camera body 100 comprises a command dial 160, a menu determination button 162, a select button 164, a display section 150, and the like. The user changes the imaging condition setting, other various settings, and the sort order of the stop ring according to the embodiment by using the command dial 160, the menu determination button 162, the select button 164, and the display section 150.

The embodiment will exemplify the lens unit 200 comprising the indication area 218 ranging from "A" to "2" in order the left to the right as viewed from the rear along the optical axis OA shown in FIG. 2. In the following description, this sort order is in the initial state (or default).

FIGS. 10 to 13 are diagrams showing a menu screen displayed on the display section 150 that is capable of changing the sort order in the stop ring 208 displayed on the display section 150.

After the lens unit 200 is mounted on the camera body 100, a user operates the menu determination button 162, then selects the "stop ring and order setting" through the select button 164, and determines the setting through the menu determination button 162. The camera control section 140 displays a menu of the stop ring and order setting on the display section 150 shown in FIG. 10. The change mode can be executed by selecting and then determining the change mode to be executed from the menu screen of the stop ring and order setting.

Figure 10:
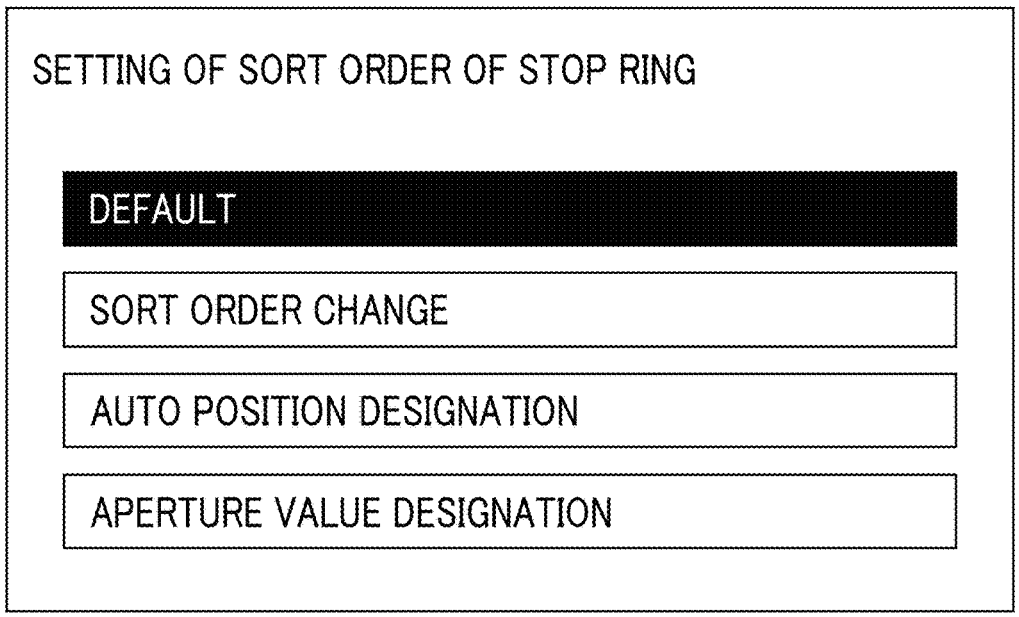
FIG. 10 is a diagram showing an example of a menu screen displayed on a display section.

As shown in FIG. 10, the menu of the stop ring and order setting includes four items of default, sort order change, AUTO position designation, and aperture value designation. In FIG. 10, unlike the other three items, the default is highlighted. This indication indicates that the change mode can be applied. Therefore, the sort order in the stop ring 208 is in the initial state. It should be noted that the sort order change, the AUTO position designation, and the aperture value designation are the plurality of sub change modes.

Figure 11:
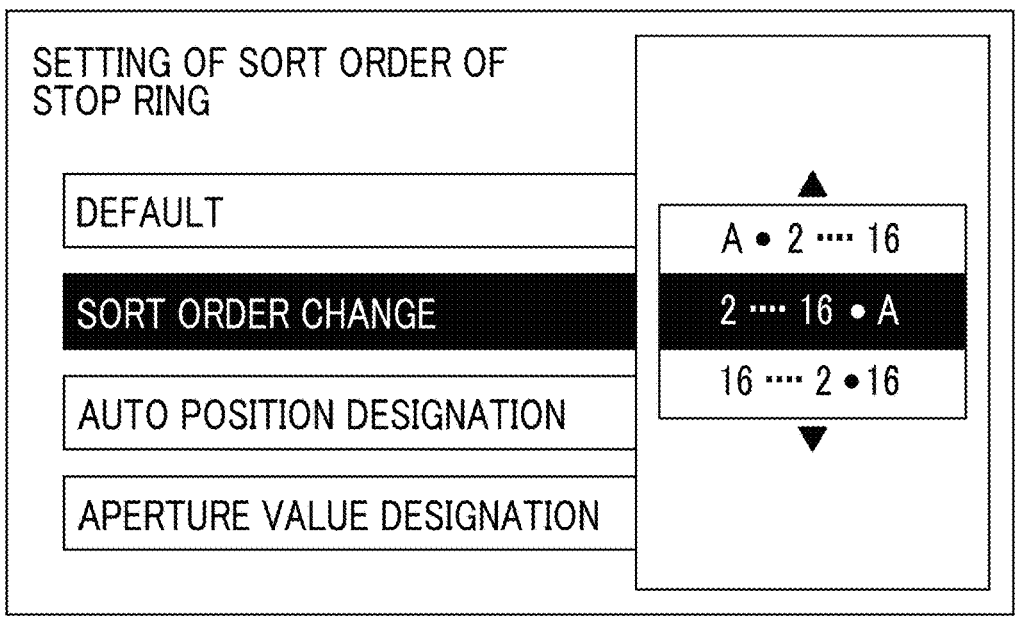
FIG. 11 is a diagram showing an example of a menu screen displayed on the display section.

FIG. 11 shows a state where the sort order change is selected through the select button 164 and is determined through the menu determination button 162. In FIG. 11, unlike the other three times, the sort order change is highlighted. In addition, a sub menu is displayed. The sub menu shows selectable sort orders. The top of the sub menu indicates that the sort order can be changed from "A" to "16" in order from the left to the right. Unlike the initial state, the order of the plurality of aperture values is reversed, and the order of the plurality of aperture values is changed from "2" to "16" in order from the left to the right. On the other hand, the position of the single auto indication is the same as that in the initial state.

Unlike the other two items, the middle item of the sub menu is highlighted. This shows that the middle item of the sub menu is selected. The middle item of the sub menu indicates that the sort order can be changed from "A" to "16". Unlike the initial state, the order of the single auto indication and the plurality of aperture values is reversed, and the sort order is changed from "2" to "A" in order from the left to the right.

The bottom item of the sub menu indicates that the sort order can be changed from "16" to "A". Unlike the initial state, the order of the indication areas is reversed, and the order of the single auto indication and the plurality of aperture values is changed from "16" to "A" in order from the left to the right.

The user is able to select a first change mode including the reversal of the sort order of the plurality of aperture values, which is one of the sub change modes, by selecting any one of the sort order changes in the sort order change mode.

Figure 12:
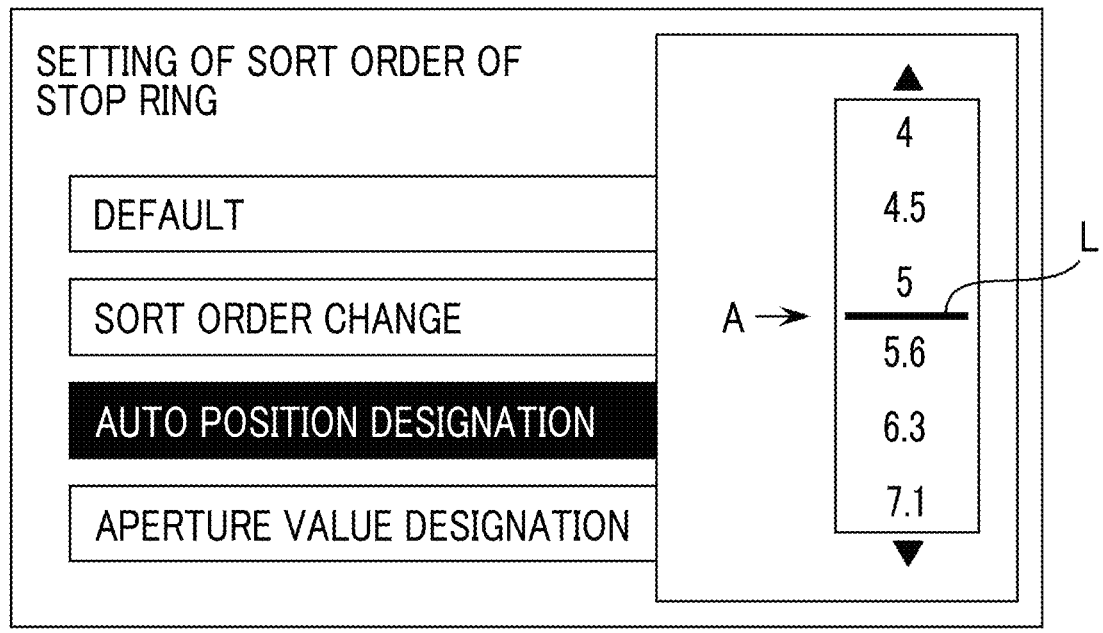
FIG. 12 is a diagram showing an example of a menu screen displayed on the display section.

FIG. 12 shows a state where the AUTO position designation is selected through the select button 164 and is determined through the menu determination button 162. In FIG. 12, unlike the other three items, the AUTO position designation is highlighted. In addition, a sub menu is displayed. The sub menu shows a position where "A" as the auto indication can be disposed.

As shown in FIG. 12, the sub menu shows the plurality of aperture values "4" to "7.1" in order from the top to the bottom. The sub menu can be scrolled up and down, and is able to show the plurality of aperture values "2" to "16". The sub menu shows "A" corresponding to the auto indication. An arrow is shown to be directed from "A" as the auto indication toward the plurality of aperture values. In the embodiment, a straight line L extending in the left-right direction is shown at a position corresponding to the arrow. "5" and "5.6" as the adjacent aperture values are shown at positions between which the straight line L is interposed. In the embodiment, the auto indication can be positioned between "5" and "5.6" as the adjacent aperture values.

In the embodiment, the position where the straight line L is shown is fixed. By scrolling the plurality of aperture values in the up-down directions, the relative position between the straight line L and the aperture value can be changed. Using the AUTO position designation menu, the user is able to freely determine the position of the auto indication in the plurality of aperture values.

In the AUTO position designation mode, the user is able to select a second change mode for changing the position of the auto indication, which is one of the sub change modes, by selecting the position where the auto indication is inserted in the plurality of aperture values.

Figure 13:
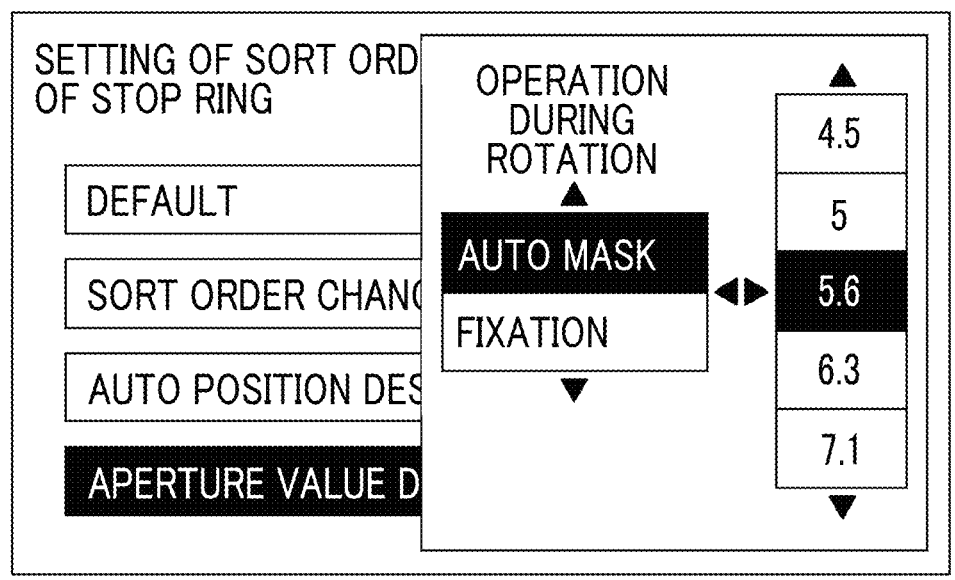
FIG. 13 is a diagram showing an example of a menu screen displayed on the display section.

FIG. 13 shows a state in which the aperture value designation is selected through the select button 164 and is determined through the menu determination button 162. In FIG. 13, unlike the other three items, the aperture value designation is highlighted. In addition, a sub menu is displayed. The sub menu shows the AUTO mask and fixation. The sub menu further shows the plurality of aperture values "4.5" to "7.1" in order from the top to the bottom. The plurality of aperture values can be scrolled up and down.

In the embodiment, the selected AUTO mask is highlighted. In addition, among the plurality of aperture values, "5.6" as the selected aperture value is highlighted. In the AUTO mask, all except "5.6" as the selected aperture value can be changed to "A" as the auto indication.

In the AUTO mask mode, the user is able to select a third change mode, which is for changing from the plurality of aperture values to one aperture value and a single auto indication, as one of the sub change modes by selecting any one of the plurality of aperture values.

Next, fixation that is not selected will be described. In a case where "FIXATION" is selected, as in the AUTO mask, the sub menu further shows the plurality of aperture values "4.5" to "7.1" in order from the top to the bottom. The plurality of aperture values can be scrolled up and down.

For example, by selecting "5.6" as the aperture value among the plurality of aperture values from the sub menu, only "5.6" as the aperture value can be selected. The auto indication is not selected.

In the fixation mode, the user is able to select a fourth change mode, which is for changing from the single auto indication and the plurality of aperture values to only one aperture value, as one of the sub change modes, by selecting any one of the plurality of aperture values.

Next, in the change mode, a method of calculating a new position number in accordance with an algorithm from the position number in the initial state in each sub change mode will be described. The following calculation is executed by the camera control section 140 of the camera body 100.

<First Change Mode>

First, an algorithm in the first change mode including reversal of the sort order of the plurality of aperture values will be described with reference to a program list. The top indication shown in the sub menu of FIG. 11 is referred to as a 1-A mode, the middle indication is referred to as a 1-B mode, and the bottom indication is referred to as a 1-C mode. FIG. 14 is a table showing the calculation results in the first change mode.

(1-A Mode) The number of aperture values (so-called number of steps) of the lens unit 200 to be mounted is IP_MAX. As shown in FIG. 14, the number of aperture values is 19 in the initial state. Therefore, IP_MAX=19. I_RING_POS_DEF_A=(0) is assigned to the rotational position of "A" as the position number. That is, the position number of "A" is (0). Among the plurality of aperture values, I_RING_POS_DEF_MAX=IP_MAX is assigned as the position number to the rotational position of "16" having the largest aperture value (so-called minimum stop). That is, the position number of "16" is (19). Among the plurality of aperture values, I_RING_POS_DEF_MIN=(1) is assigned as the position number to the rotational position of "2" having the smallest aperture value (so-called open F number). That is, the position number of "2" is (1).

The position numbers for the 19-step rotational positions of the aperture value in the embodiment are able to take values of integer between the position numbers (1) to (IP_MAX) of the smallest aperture value. Therefore, in the embodiment, as shown in FIG. 14, the position numbers are (19), (18), (17), (16), (15), (14), (13), (12), (11), (10), (9), (8), (7), (6), (5), (4), (3), (2), and (1) for 19-step rotational positions ("16" to "2").

In the embodiment, the current position number in the initial state is I_RING_POS_CURRENT=(N), and the new position number after calculation, that is, the new position number is I_RING_POS_REARRANGE. (N) is able to take an integer ranging from (0) or (1) to (IP_MAX). In the embodiment, an integer ranging from (0) or (1) to (19) can be taken.

In the 1-A mode, a new position number is calculated by the following Expression (1-A).

New position number (I_RING_POS_REAR-
RANGE)={(IP_MAX+1)−current position
number (I_RING_POS_CURRENT)}%(IP_
MAX+1)    Expression (1-A).

Here, % indicates the remainder.

Using the rotational positions "A", "16", and "2" as an example, a new position number is calculated from the current position number. Since the lens unit 200 has 19 steps, (IP_MAX+1)=19+1=20. For "A", the current position number (I_RING_POS_CURRENT)=(0). In a case where the values are substituted into Expression (1-A), the new position number is obtained as follows.

New position number (I_RING_POS_REAR-
RANGE)={20−(0)}%20=(0).

For "16", the current position number (I_RING_POS_CURRENT)=(19). In a case where the values are substituted into Expression (1-A), the new position number is obtained as follows.

New position number (I_RING_POS_REAR-
RANGE)={20−(19)}%20=(1).

For "2", the current position number (I_RING_POS_CURRENT)=(1). In a case where the values are substituted into Expression (1-A), the new position number is obtained as follows.

New position number (I_RING_POS_REAR-
RANGE)={20−(1)}%20=(19).

For other aperture values, the calculated position numbers are noted in the 1-A mode column in the table of FIG. 14. The unit number corresponding to each position number is described.

(1-B Mode)

In the 1-B mode, a new position number is calculated by the following Expression (1-B).

New position number (I_RING_POS_REAR-RANGE)={(IP_MAX+2)−current position number (I_RING_POS_CURRENT)}%(IP_MAX+1)          Expression (1-B).

Here, % indicates the remainder.

Using the rotational positions "A", "16", and "2" as an example, the position number is calculated. Since the lens unit 200 has 19 steps, (IP_MAX+2)=19+2=21.

For "A", the current position number (I_RING_POS_CURRENT)=(0). In a case where the values are substituted into Expression (1-B), the new position number is obtained as follows.

New position number (I_RING_POS_REAR-RANGE)={21−(0)}%20=(1).

For "16", the current position number (I_RING_POS_CURRENT)=(19). In a case where the values are substituted into Expression (1-B), the new position number is obtained as follows.

New position number (I_RING_POS_REAR-RANGE)={21−(19)}%20=(2).

For "2", the current position number (I_RING_POS_CURRENT)=(1). In a case where the values are substituted into Expression (1-B), the new position number is obtained as follows.

New position number (I_RING_POS_REAR-RANGE)={21−(1)}%20=(0).

For other aperture values, the calculated position numbers are noted in the 1-B mode column of the table of FIG. 14. The unit numbers corresponding to the respective position numbers are noted.

(1-C Mode)

In the 1-C mode, a new position number is calculated by the following Expression (1-C).

New position number (I_RING_POS_REAR-RANGE)={IP_MAX+current position number (I_RING_POS_CURRENT)}%(IP_MAX+1)          Expression (1-C).

Here, % indicates the remainder.

Using the rotational positions "A", "16", and "2" as an example, the position number is calculated. Since the lens unit 200 has 19 steps, (IP_MAX+1)=19+1=20.

For "A", the current position number (I_RING_POS_CURRENT)=(0). In a case where the values are substituted into Expression (1-C), the new position number is obtained as follows.

New position number (I_RING_POS_REAR-RANGE)={19+(0)}%20=(19).

For "16", the current position number (I_RING_POS_CURRENT)=(19). In a case where the values are substituted into Expression (1-C), the new position number is obtained as follows.

New position number (I_RING_POS_REAR-RANGE)={19+(19)}%20=(18).

For "2", the current position number (I_RING_POS_CURRENT)=(1). In a case where the values are substituted into Expression (1-C), the new position number is obtained as follows.

New position number (I_RING_POS_REAR-RANGE)={19+(1)}%20=(0).

For other aperture values, the calculated position numbers are noted in the 1-C mode column of the table of FIG. 14. The unit numbers corresponding to the respective position numbers are noted.

In a case of imaging through the camera system 1, a unit number corresponding to the position number is transmitted as a control signal from the camera body 100 to the lens unit 200 in accordance with each of the 1-A mode, the 1-B mode, and the 1-C mode. The stop unit 232 is driven such that the stop diameter corresponds to the unit number. It can be understood that the order of the stop ring 208 has been sorted.

In the first change mode, it is determined which of Expression (1-A), Expression (1-B), and Expression (1-C) is applied by selecting on the menu screen shown in FIG. 11.

<Second Change Mode>

Figure 15:
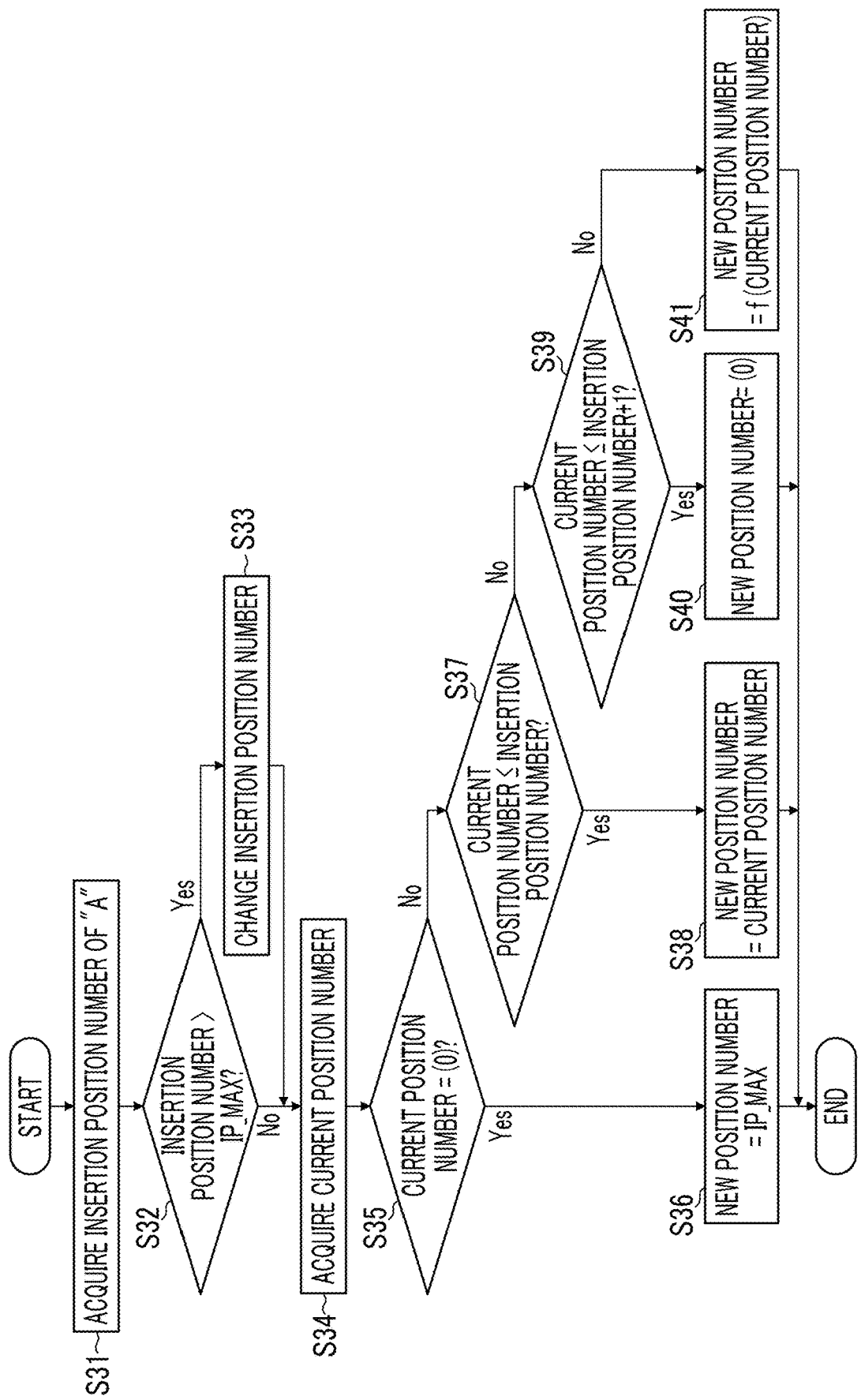
FIG. 15 is a flowchart for acquiring a new position number in a second change mode.

FIG. 15 is a flowchart for acquiring a new position number in the second change mode. FIG. 16 is a table showing the calculation results in the second change mode.

In the second change mode, the insertion position number into which "A" is inserted is I_RING_POS_A_INSERT. An available value of the insertion position number (I_RING_POS_A_INSERT) is (0) or a positive integer.

First, at the start, the insertion position of "A" is determined from the menu screen shown in FIG. 12. Next, the insertion position number (I_RING_POS_A_INSERT) of "A" is acquired (step S31). For example, in a case where the insertion position is between "6.3" and "5.6" (2-A mode), the insertion position number (I_RING_POS_A_INSERT)=(10). In a case where the insertion position of "A" is between "4.5" and "4" (2-B mode), the insertion position number (I_RING_POS_A_INSERT)=(7). In a case where the insertion position of "A" is outside "2" (2-C mode), the insertion position number (I_RING_POS_A_INSERT)=(0). In a case where the insertion position of "A" is outside "16" and "14" (2-D mode), the insertion position number (I_RING_POS_A_INSERT)=(IP_MAX−1)=(18).

Next, in a case where a different lens unit is mounted, it is determined whether the insertion position number (I_RING_POS_A_INSERT) is greater than the number of steps (IP_MAX) of the different lens unit (step S32). Here, in a case where the determination result is "Yes", the insertion position number (I_RING_POS_A_INSERT) is changed (step S33). Insertion position number (I_RING_POS_A_INSERT)=IP_MAX−1. Here, in a case where the determination result is "No", the insertion position number (I_RING_POS_A_INSERT) is not changed.

Next, the current position number (I_RING_POS_CURRENT) is acquired (step S34). Similarly to the above description, the current position number (I_RING_POS_CURRENT)=(N) is acquired.

Next, it is determined whether the current position number (I_RING_POS_CURRENT)=(0) (step S35). Here, in a case where the determination result is "Yes", the new position number (I_RING_POS_REARRANGE)=IP_MAX is set (step S36). As shown in FIG. 16, in the 19-step lens unit 200, IP_MAX=19. In a case where the current position number (I_RING_POS_CURRENT)=(0) in the initial state, the new position number (I_RING_POS_REARRANGE)=(19) in the 2-A mode, 2-B mode, 2-C mode, and 2-D mode.

In a case where it is determined that the current position number (I_RING_POS_CURRENT)=(0) is "No" (step S35), then it is determined whether the current position number (I_RING_POS_CURRENT)≤the insertion position number (I_RING_POS_A_INSERT) (step S37). Here, in a case where the determination result is "Yes", the new position number (I_RING_POS_REARRANGE)=the current position number (I_RING_POS_CURRENT) is set (step S38). As shown in FIG. 16, for the 2-A mode, the insertion position number (I_RING_POS_A_INSERT)=(10). In a case where the current position number (I_RING_POS_CURRENT) in the initial state is in the range of (1) to (10), the new position number (I_RING_POS_REARRANGE)=the current position number (I_RING_POS_CURRENT).

For the 2-B mode, the insertion position number (I_RING_POS_A_INSERT)=(7). In a case where the current position number (I_RING_POS_CURRENT) in the initial state is in the range of (1) to (7), the new position number (I_RING_POS_REARRANGE)=the current position number (I_RING_POS_CURRENT).

For the 2-D mode, the insertion position number (I_RING_POS_A_INSERT)=(18). In a case where the current position number (I_RING_POS_CURRENT) in the initial state is in the range of (1) to (18), the new position number (I_RING_POS_REARRANGE)=the current position number (I_RING_POS_CURRENT).

In a case where it is determined that the current position number (I_RING_POS_CURRENT)≤the insertion position number (I_RING_POS_A_INSERT) is "No" (step S37), it is determined whether the current position number (I_RING_POS_CURRENT)≤the insertion position number (I_RING_POS_A_INSERT)+1 (step S39). Here, in a case where the determination result is "Yes", the new position number (I_RING_POS_REARRANGE)=(0) is set (step S40).

As shown in FIG. 16, the current position number (I_RING_POS_CURRENT)=(11) in the initial state in the 2-A mode, the current position number (I_RING_POS_CURRENT)=(8) in the initial state in the 2-B mode, the current position number (I_RING_POS_CURRENT)=(1) in the initial state in the 2-C mode, and the current position number (I_RING_POS_CURRENT)=(19) in the initial state in the 2-D mode. In this case, the new position number (I_RING_POS_REARRANGE)=(0).

In a case where it is determined that the current position number (I_RING_POS_CURRENT)≤the insertion position number (I_RING_POS_A_INSERT)+1 is "No" (step S39), the new position number=f(current position number) on the basis of the following Expression (2), whereby a new position number is calculated (step S41).

New position number (I_RING_POS_REARRANGE)={IP_MAX+current position number (I_RING_POS_CURRENT)}%(IP_MAX+1)   Expression (2).

Here, % indicates the remainder.

In the 2-A mode, in a case where the current position number (I_RING_POS_CURRENT)=(12) in the initial state, the new position number is as follows in a case where the number is substituted into Expression (2). New position number (I_RING_POS_REARRANGE)={19+(12)}%(20)=(11).

In the 2-B mode, in a case where the current position number (I_RING_POS_CURRENT)=(9) in the initial state, the new position number is as follows in a case where the number is substituted into Expression (2).

New position number (I_RING_POS_REARRANGE)={19+(9)}%(20)=(8).

In the 2-C mode, in a case where the current position number (I_RING_POS_CURRENT)=(1) in the initial state, the new position number is as follows in a case where the number is substituted into Expression (2).

New position number (I_RING_POS_REARRANGE)={19+(1)}%(20)=(0).

The position numbers after calculation in the second change mode are noted in the 2-A mode column, 2-B mode column, 2-C mode column, and 2-D mode column of the table of FIG. 16. In the table of FIG. 16, the unit numbers corresponding to the respective position numbers are noted.

In a case of imaging through the camera system 1, unit numbers corresponding to the position numbers of the 2-A mode, 2-B mode, 2-C mode, and 2-D mode are transmitted as control signals from the camera body 100 to the lens unit 200. The stop unit 232 is driven such that the stop diameter corresponds to the unit number. It can be understood that the order of the stop ring 208 has been sorted.

<Third Change Mode>

Figure 17:
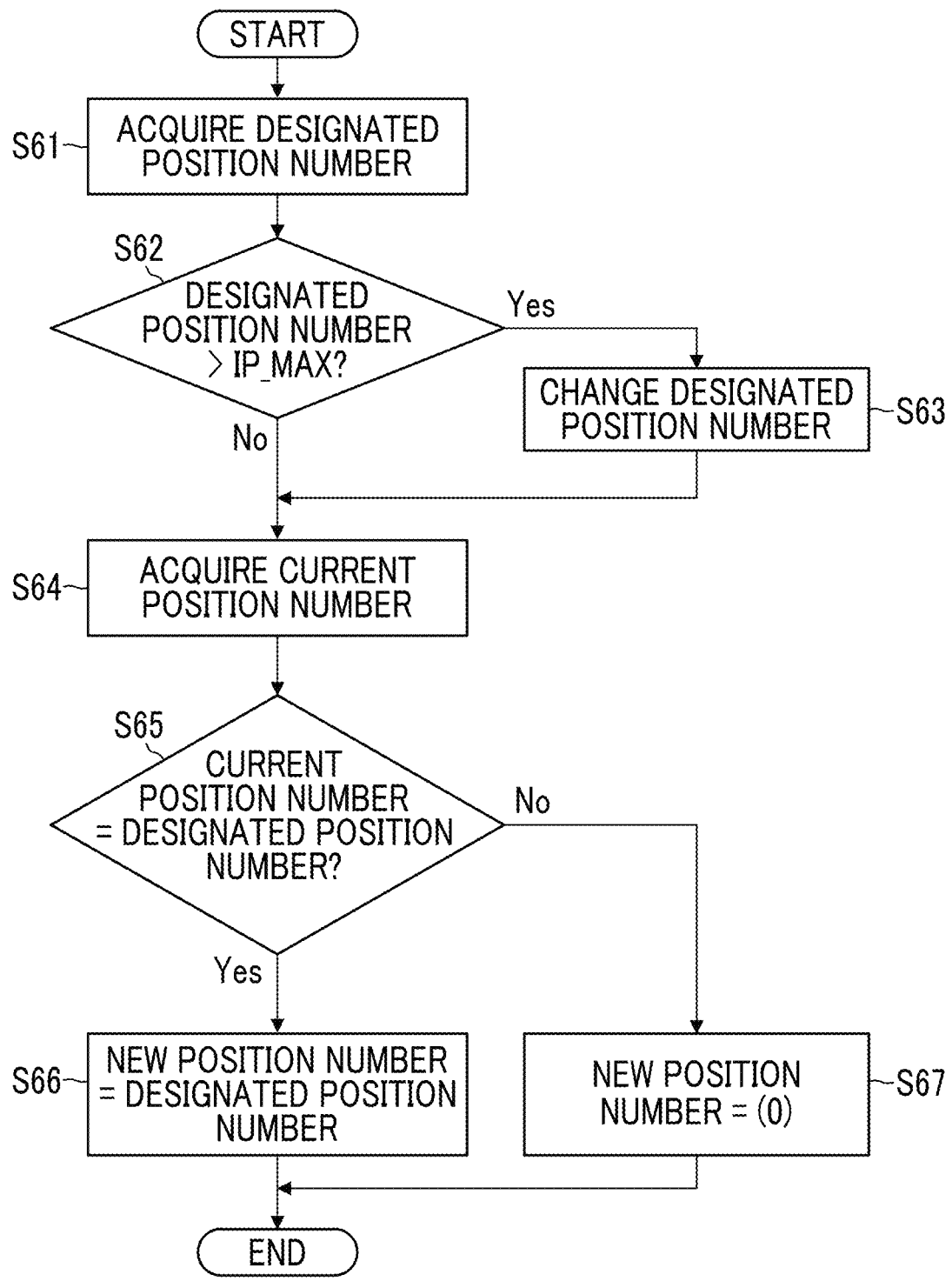
FIG. 17 is a flowchart for acquiring a new position number in a third change mode.

FIG. 17 is a flowchart for acquiring a new position number in the third change mode. FIG. 18 is a table showing calculation results in the third change mode.

In the third change mode, the position number of the designated aperture value (hereinafter, designated position number) is set as I_RING_POS_MASK. An available value of the designated position number (I_RING_POS_MASK) is 0 or a positive integer.

First, at the start, an aperture value to be designated is determined from the menu screen shown in FIG. 13. In the third change mode, all other than the designated aperture value are changed to "A".

Next, the designated position number (I_RING_POS_MASK) is acquired (step S61). In a case where all other than "5.6" are changed to "A" (3-A mode), the designated position number (I_RING_POS_MASK)=(10). In a case where all other than "4" are changed to "A" (3-B mode), the designated position number (I_RING_POS_MASK)=(7).

Next, in a case where a different lens unit is mounted, it is determined whether the acquired designated position number (I_RING_POS_MASK) is equal to or greater than the number of steps (IP_MAX) of the different lens unit (step S62). Here, in a case where the determination result is "Yes", the designated position number (I_RING_POS_MASK) is changed (step S63). The designated position number (I_RING_POS_MASK)=IP_MAX. Here, in a case where the determination result is "No", the designated position number (I_RING_POS_MASK) is not changed.

Next, the current position number (I_RING_POS_CURRENT) is acquired (step S64). Similarly to the above description, the current position number (I_RING_POS_CURRENT)=(N) is acquired.

Next, it is determined whether the current position number (I_RING_POS_CURRENT)=the designated position number (I_RING_POS_MASK) (step S65). Here, in a case where the determination result is "Yes", the new position number (I_RING_POS_REARRANGE)=designated position number (I_RING_POS_MASK) is set (step S66).

As shown in FIG. 18, in the 3-A mode, in a case where the current position number (I_RING_POS_CURRENT)=(10) in the initial state, the new position number (I_RING_POS_REARRANGE)=(10). In the 3-B mode, in a case where the current position number (I_RING_POS_CURRENT)=(7) in the initial state, the new position number (I_RING_POS_REARRANGE)=(7).

In a case where it is determined that the current position number (I_RING_POS_CURRENT)=the designated position number (I_RING_POS_MASK) is "No" (step S65), the new position number (I_RING_POS_REARRANGE)=(0) (step S67).

As shown in FIG. 18, in the 3-A mode, in a case where the current position number (I_RING_POS_CURRENT)=(10) in the initial state is other than the new position number (I_RING_POS_REARRANGE)=(0). In the 3-B mode, in a case where the current position number (I_RING_POS_CURRENT)=(7) in the initial state is other than the new position number (I_RING_POS_REARRANGE)=(0).

The position numbers after calculation in the third change mode are noted in the 3-A mode column and 3-B mode column of the table of FIG. 18. The unit numbers corresponding to the respective position numbers are noted.

In a case of imaging through the camera system 1, a unit number corresponding to the position number of each mode is transmitted as a control signal from the camera body 100 to the lens unit 200. The stop unit 232 is driven such that the stop diameter corresponds to the unit number. It can be understood that the order of the stop ring 208 has been sorted.

<Fourth Change Mode>

FIG. 19 is a table showing calculation results in the fourth change mode.

In the fourth change mode, first, an aperture value to be fixed is determined from the menu screen shown in FIG. 13. In the fourth change mode, the position number (hereinafter, fixed position number) of the aperture value to be fixed is set as I_RING_POS_FIX. An available value of the fixed position number (I_RING_POS_FIX) is (0) or a positive integer.

In a case where it is desired to fix the aperture value to "5.6" (4-A mode), the fixed position number (I_RING_POS_FIX)=(10). In a case where it is desired to fix the aperture value to "4" (4-B mode), the fixed position number (I_RING_POS_FIX)=(7).

Next, in a case where a different lens unit is mounted, it is determined whether the set fixed position number (I_RING_POS_FIX) is greater than the number of steps (IP_MAX) of the different lens unit. In a case where the fixed position number (I_RING_POS_FIX)>P_MAX, the fixed position number is changed such that (I_RING_POS_FIX)=IP_MAX.

In the fourth change mode, the new position number (I_RING_POS_REARRANGE)=the fixed position number (I_RING_POS_FIX). In the 4-A mode, the new position number (I_RING_POS_REARRANGE)=(10), in the 4-B mode, the new position number (I_RING_POS_REARRANGE)=(7), and the position numbers after calculation in the fourth change mode are noted in the 4-A mode column and 4-B mode column of the table of FIG. 19. The unit numbers corresponding to the respective position numbers are noted.

In a case of imaging through the camera system 1, a unit number corresponding to the position number of each mode is transmitted as a control signal from the camera body 100 to the lens unit 200. The stop unit 232 is driven such that the stop diameter corresponds to the unit number. It can be understood that the order of the stop ring 208 has been sorted.

The embodiment describes a plurality of algorithms for calculating new position numbers, but the present invention is not limited to this. In the embodiment, it can be understood that it is important that the new position number can be calculated on the basis of a certain rule. According to the embodiment, the user is able to perform a smooth switching operation of the stop ring by the user himself/herself changing the sort order of the stop rings.

Hereinafter, the effects of the first to fourth change modes will be described.

For example, in a case where the open F number is frequently used in the auto mode and the manual mode, the user is able to reduce the amount of rotation of the stop ring by changing the mode to the 1-A mode or 1-C mode shown in FIG. 14.

By changing the mode to the 1-B mode, the user is able to perform change to a position where it becomes easy for the user to operate the rotation direction of the stop ring and the aperture value at the rotation end.

By changing the mode to the second change mode or the third change mode, "A" of the auto mode can be disposed near the frequently used aperture value. Therefore, the user is able to smoothly switch between the stop priority mode and the auto mode.

By changing the mode to the fourth change mode, the user is able to prevent deviation from the set aperture value due to undesirable rotation of the stop ring.

The above-mentioned embodiment has described the case where the camera control section 140 of the camera body 100 executes the change mode (calculation of a new position number). The execution of the change mode is not limited to the camera control section 140, and the lens control section 226 of the lens unit 200 may execute the change mode.

A case where the change mode is executed in the lens unit 200 will be described with reference to FIG. 7. As shown in the flowchart of FIG. 7, steps S11 to S15 are executed. Next, the lens control section 226 of the lens unit 200 confirms the type of the change mode and whether or not the change mode is applied to the camera control section 140. This confirmation corresponds to step S18. In a case where it is determined that the change mode is applied, that is, the determination result is "Yes", the lens control section 226 determines whether or not the change mode is applied, and specifies the sub change mode. The lens control section 226 calculates a new position number in accordance with the change mode. The calculation of the position number corresponds to step S19.

In a case where the new position number is calculated, the lens control section 226 controls the stop unit 232. The stop leaf blade 232A of the stop unit 232 is driven so as to have a stop diameter corresponding to the new position number. In a case where the change mode is not applied, the lens control section 226 controls the stop unit 232 such that the stop diameter corresponds to the position number of the aperture value in the initial state. The current position number is transmitted from the lens unit 200.

In a case where the release switch 102 of the camera body 100 is operated, imaging processing is executed. At this time, the stop diameter of the lens unit 200 has already been controlled by the lens control section 226.

Next, a case where a lens unit (hereinafter referred to as a first lens unit) that is mounted when the sort order of the stop ring is set and a different lens unit (hereinafter referred to as a second lens unit) are mounted will be described.

In a case where the first lens unit and the second lens unit have the same positional relationship with respect to the plurality of aperture values and the stop ring, the change mode of the first lens unit is applied to the second lens unit as it is.

On the other hand, in a case where the first lens unit and the second lens unit have different positional relationships with respect to the plurality of aperture values and the stop ring, the same change mode can be applied to the second lens unit by applying the following mode.

<Second Change Mode>

FIG. 20 is a table showing calculation results in the second change mode after the lens unit is replaced. As shown in FIG. 20, in a case where the first lens unit is mounted, it is determined that "A" is inserted between "6.3" and "5.6". Insertion position number (I_RING_POS_A_INSERT)=(10). The unit number (corresponding aperture value) corresponding to the insertion position number (I_R-

ING_POS_A_INSERT)=(10) is held as the corresponding aperture value (I_RING_POS_ARRANGE_FNUM)= "F5.6".

Next, in a case where the second lens unit is mounted, information of the correspondence table of the initial state of the second lens unit shown in FIG. 20 is acquired by, for example, the camera control section 140. It is searched whether the corresponding aperture value (I_RING_POS_ARRANGE_FNUM)="F5.6" exists in the unit number of the second lens unit. When "F5.6" is found in the unit number of the second lens unit, the position number (7) corresponding to "F5.6" is acquired. The insertion position number is changed such that (I_RING_POS_A_INSERT)= (7). The 2-A mode is applied to the second lens unit.

In a case where the corresponding aperture value (I_RING_POS_ARRANGE_FNUM) is less than the unit number of the second lens unit, the insertion position number is changed such that (I_RING_POS_A_INSERT)=(0). For example, in a case where the corresponding aperture value (I_RING_POS_ARRANGE_FNUM)="F2.5", the aperture value is less than the minimum unit number "F2.8" of the second lens unit. Therefore, the insertion position number is changed such that (I_RING_POS_A_INSERT)=(0). The second change mode is applied to the second lens unit.

In a case where the corresponding aperture value (I_RING_POS_ARRANGE_FNUM) is greater than the unit number of the second lens unit, the insertion position number is changed such that (I_RING_POS_A_INSERT)= IP_MAX−1. For example, in a case where the corresponding aperture value (I_RING_POS_ARRANGE_FNUM)= "F45", the aperture value is greater than the maximum unit number "F32" of the second lens unit. Therefore, the insertion position number is changed such that (I_RING_POS_A_INSERT)=(22−1)=(21). The second change mode is applied to the second lens unit.

In a case where the corresponding aperture value (I_RING_POS_ARRANGE_FNUM) does not exist in the unit number of the second lens unit, the unit number of the second lens unit closest to the corresponding aperture value (I_RING_POS_ARRANGE_FNUM) is selected. The position number (N) corresponding to the selected unit number is acquired and the insertion position number is changed such that (I_RING_POS_A_INSERT)=(N).

For example, in a case where the corresponding aperture value (I_RING_POS_ARRANGE_FNUM)="F4.5" and the second lens unit is ½ step, the unit number "F4.8" of the second lens unit is selected. The position number (N) corresponding to this unit number "F4.8" is acquired and the insertion position number is changed such that (I_RING_POS_A_INSERT)=(N). The second change mode is applied to the second lens unit.

<Third Change Mode>

FIG. 21 is a table showing calculation results in the third change mode after the lens unit is replaced. As shown in FIG. 21, in a case where the first lens unit is mounted, it is determined that all other than "5.6" are set to "A". Therefore, the designated position number (I_RING_POS_MASK)=(10). The unit number (corresponding aperture value) corresponding to the designated position number (I_RING_POS_MASK)=(10) is held as the corresponding aperture value (I_RING_POS_ARRANGE_FNUM)= "F5.6".

Next, in a case where the second lens unit is mounted, information of the correspondence table of the initial state of the second lens unit shown in FIG. 21 is acquired by, for example, the camera control section 140. It is searched whether the corresponding aperture value (I_RING_POS_ARRANGE_FNUM)="F5.6" exists in the unit number of the second lens unit. When "F5.6" is found in the unit number of the second lens unit, the position number (7) corresponding to "F5.6" is acquired. The designated position number is changed such that (I_RING_POS_MASK)=(7). The 3-A mode is applied to the second lens unit.

In a case where the corresponding aperture value (I_RING_POS_ARRANGE_FNUM) is less than the unit number of the second lens unit, the designated position number is changed such that (I_RING_POS_MASK)=(1). For example, in a case where the corresponding aperture value (I_RING_POS_ARRANGE_FNUM)="F2.5", the aperture value is less than the minimum unit number "F2.8" of the second lens unit. Therefore, the designated position number is changed such that (I_RING_POS_MASK)=(1). The third change mode is applied to the second lens unit.

In a case where the corresponding aperture value (I_RING_POS_ARRANGE_FNUM) is greater than the unit number of the second lens unit, the designated position number is changed such that (I_RING_POS_MASK)=IP_MAX. For example, in a case where the corresponding aperture value (I_RING_POS_ARRANGE_FNUM)= "F45", the aperture value is greater than the maximum unit number "F32" of the second lens unit. Therefore, the designated position number is changed such that (I_RING_POS_MASK)=(22). The third change mode is applied to the second lens unit.

In a case where the corresponding aperture value (I_RING_POS_ARRANGE_FNUM) does not exist in the unit number of the second lens unit, the unit number of the second lens unit closest to the corresponding aperture value (I_RING_POS_ARRANGE_FNUM) is selected. The position number (N) corresponding to the selected unit number is acquired and the designated position number is changed such that (I_RING_POS_MASK)=(N).

For example, in a case where the corresponding aperture value (I_RING_POS_ARRANGE_FNUM)="F4.5" and the second lens unit is ½ step, the unit number "F4.8" of the second lens unit is selected. The position number (N) corresponding to this unit number "F4.8" is acquired and the designated position number is changed such that (I_RING_POS_MASK)=(N). The third change mode is applied to the second lens unit.

<Fourth Change Mode>

FIG. 22 is a table showing calculation results in the fourth change mode after the lens unit is replaced. As shown in FIG. 22, it is determined that the aperture value is fixed at "5.6" in a case where the first lens unit is mounted. Therefore, the fixed position number (I_RING_POS_FIX)=(10). The unit number (corresponding aperture value) corresponding to the fixed position number (I_RING_POS_FIX)=(10) is held as the corresponding aperture value (I_RING_POS_ARRANGE_FNUM)="F5.6".

Next, in a case where the second lens unit is mounted, information of the correspondence table of the initial state of the second lens unit shown in FIG. 22 is acquired by, for example, the camera control section 140. It is searched whether the corresponding aperture value (I_RING_POS_ARRANGE_FNUM)="F5.6" exists in the unit number of the second lens unit. When "F5.6" is found in the unit number of the second lens unit, the position number (7) corresponding to "F5.6" is acquired. The fixed position number is changed such that (I_RING_POS_FIX)=(7). The 4-A mode is applied to the second lens unit.

In a case where the corresponding aperture value (I_RING_POS_ARRANGE_FNUM) is less than the unit number of the second lens unit, the fixed position number is changed such that (I_RING_POS_FIX)=(1). For example, in a case where the corresponding aperture value (I_RING_POS_ARRANGE_FNUM)="F2.5", the aperture value is less than the minimum unit number "F2.8" of the second lens unit. Therefore, the fixed position number is changed such that (I_RING_POS_FIX)=(1). The fourth change mode is applied to the second lens unit.

In a case where the corresponding aperture value (I_RING_POS_ARRANGE_FNUM) is greater than the unit number of the second lens unit, the fixed position number is changed such that (I_RING_POS_FIX)=IP_MAX. For example, in a case where the corresponding aperture value (I_RING_POS_ARRANGE_FNUM)="F45", the aperture value is greater than the maximum unit number "F32" of the second lens unit. Therefore, the fixed position number is changed such that (I_RING_POS_FIX)=(22). The fourth change mode is applied to the second lens unit.

In a case where the corresponding aperture value (I_RING_POS_ARRANGE_FNUM) does not exist in the unit number of the second lens unit, the unit number of the second lens unit closest to the corresponding aperture value (I_RING_POS_ARRANGE_FNUM) is selected. The position number (N) corresponding to the selected unit number is acquired and the fixed position number is changed such that (I_RING_POS_FIX)=(N).

For example, in a case where the corresponding aperture value (I_RING_POS_ARRANGE_FNUM)="F4.5" and the second lens unit is ½ step, the unit number "F4.8" of the second lens unit is selected. The position number (N) corresponding to this unit number "F4.8" is acquired and the fixed position number is changed such that (I_RING_POS_FIX)=(N). The fourth change mode is applied to the second lens unit.

EXPLANATION OF REFERENCES

1: camera system
100: camera body
102: release switch
104: exposure compensation dial
106: shutter speed dial
108: focus mode switching lever
110: viewfinder switching lever
112: lens attachment/detachment button
114: power lever
116: hot shoe
118: electronic viewfinder
119: optical viewfinder window
120: grip
122: body mount
132: lock pin
136: body signal contact point
138: image sensor
140: camera control section
142: bus line
144: image memory
146: image data processing section
148: LCD driver
150: display section
152: card I/F
154: AE processing section
156: memory card
160: command dial
162: menu determination button
164: select button
200: lens unit
202: optical system
204: tube
206: focus ring
208: stop ring
210: lens mount
212: mount cover
214: lens signal contact point
218: indication area
218A: auto indication
218B: exposure amount indication
222: index
224: position detection section
226: lens control section
228: motor driver
230: motor
232: stop unit
232A: stop leaf blade
240: code plate
242: conductive portion
244: non-conductive portion
250: electrical contact point
250A: sliding section
250B: sliding section
250C: sliding section
250D: sliding section
250E: screw
C1, C2, C3, C4, C5, C6, GND: circuit wiring
OA: optical axis
L: straight line

What is claimed is:

1. A camera system comprising:
a lens unit that includes a stop ring selecting a single auto indication corresponding to an auto mode and a plurality of aperture values corresponding to a manual mode in accordance with a rotational position; and
a camera body on which the lens unit can be interchangeably mounted,
wherein the camera body includes
a display section which is capable of rewriting a sort order of the single auto indication and the plurality of aperture values, and
a camera control section which executes a change mode for changing a sort order of the plurality of aperture values and the single auto indication corresponding to the rotational position of the stop ring,
wherein the change mode includes a plurality of sub change modes, and
wherein the plurality of sub change modes include a first change mode including reversal of the sort order of the plurality of aperture values, a second change mode for changing a position of the single auto indication, a third change mode for changing to the single auto indication and a single aperture value from the plurality of aperture values, and a fourth change mode for changing to only one aperture value from the plurality of aperture values and the single auto indication.

2. The camera system according to claim 1, wherein the camera control section determines one of the single auto indication and the plurality of aperture values corresponding to a rotational position of the stop ring in accordance with the plurality of sub change modes.

3. The camera system according to claim 1,
wherein the lens unit includes a position detection section that detects a rotational position of the stop ring, a stop unit that adjusts a stop diameter, and a lens control section that drives the stop unit, and wherein the camera control section transmits a stop control signal for driving the stop unit to the lens control section.

4. The camera system according to claim 3, wherein the stop control signal includes a change mode control signal corresponding to the change mode and an initial state control signal corresponding to the sort order in an initial state.

5. The camera system according to claim 4, wherein the lens control section stores a correspondence relationship between a position number corresponding to a rotational position of the stop ring and a stop diameter corresponding to the position number, and transmits the position number to the camera control section.

6. The camera system according to claim 5, wherein the camera control section calculates the position number as a new position number in accordance with an algorithm in the change mode.

7. A camera body on which a lens unit including a stop ring selecting a single auto indication corresponding to an auto mode and a plurality of aperture values corresponding to a manual mode in accordance with a rotational position can be interchangeably mounted, the camera body comprising
    a camera control section that executes a change mode for changing a sort order of the single auto indication and the plurality of aperture values corresponding to the rotational position of the stop ring,
    wherein the change mode includes a plurality of sub change modes, and
    wherein the plurality of sub change modes include a first change mode including reversal of the sort order of the plurality of aperture values, a second change mode for changing a position of the single auto indication, a third change mode for changing to the single auto indication and a single aperture value from the plurality of aperture values, and a fourth change mode for changing to only one aperture value from the plurality of aperture values and the single auto indication.

8. A lens unit comprising:
    a stop ring that selects a plurality of aperture values corresponding to a manual mode and a single auto indication corresponding to an auto mode in accordance with a rotational position; and
    a lens control section that executes a change mode for changing a sort order of the plurality of aperture values and the single auto indication corresponding to the rotational position of the stop ring,
    wherein the change mode includes a plurality of sub change modes, and
    wherein the plurality of sub change modes include a first change mode including reversal of the sort order of the plurality of aperture values, a second change mode for changing a position of the single auto indication, a third change mode for changing to the single auto indication and a single aperture value from the plurality of aperture values, and a fourth change mode for changing to only one aperture value from the plurality of aperture values and the single auto indication.

9. A stop adjustment method comprising:
    mounting a lens unit, which includes a stop ring selecting a single auto indication corresponding to an auto mode and a plurality of aperture values corresponding to a manual mode in accordance with a rotational position, on a camera body, and acquiring a sort order of the plurality of aperture values and the single auto indication corresponding to the rotational position of the stop ring of the lens unit in an initial state;
    selecting a change mode for changing the sort order in the initial state; and
    changing the sort order in the initial state in accordance with the change mode,
    wherein the change mode includes a plurality of sub change modes, and
    wherein the plurality of sub change modes include a first change mode including reversal of the sort order of the plurality of aperture values, a second change mode for changing a position of the single auto indication, a third change mode for changing to the single auto indication and a single aperture value from the plurality of aperture values, and a fourth change mode for changing to only one aperture value from the plurality of aperture values and the single auto indication.

10. A non-transitory and computer-readable recording medium storing a program for causing a camera system to execute, in a case where a command stored in the recording medium is read by a computer:
    mounting a lens unit, which includes a stop ring selecting a single auto indication corresponding to an auto mode and a plurality of aperture values corresponding to a manual mode in accordance with a rotational position, on a camera body, and acquiring a sort order of the plurality of aperture values and the single auto indication corresponding to the rotational position of the stop ring of the lens unit in an initial state; and
selecting a change mode for changing the sort order in the initial state and thereafter changing the sort order in the initial state in accordance with the change mode,
    wherein the change mode includes a plurality of sub change modes, and
    wherein the plurality of sub change modes include a first change mode including reversal of the sort order of the plurality of aperture values, a second change mode for changing a position of the single auto indication, a third change mode for changing to the single auto indication and a single aperture value from the plurality of aperture values, and a fourth change mode for changing to only one aperture value from the plurality of aperture values and the single auto indication.

\* \* \* \* \*